US010883053B2

(12) United States Patent
Yurchick et al.

(10) Patent No.: US 10,883,053 B2
(45) Date of Patent: Jan. 5, 2021

(54) PROCESSES AND COMPOSITIONS FOR CARBON FOAMS AND MATERIALS

(71) Applicant: West Virginia University, Morgantown, WV (US)

(72) Inventors: Christopher Yurchick, Fairmont, WV (US); Alfred Stiller, Morgantown, WV (US)

(73) Assignee: West Virginia University, Morgantown, WV (US)

( * ) Notice: Subject to any disclaimer, the term of this patent is extended or adjusted under 35 U.S.C. 154(b) by 268 days.

(21) Appl. No.: 15/947,507

(22) Filed: Apr. 6, 2018

(65) Prior Publication Data
US 2019/0309226 A1 Oct. 10, 2019

(51) Int. Cl.
| | |
|---|---|
| *B01D 15/08* | (2006.01) |
| *C10C 3/00* | (2006.01) |
| *C10C 3/14* | (2006.01) |
| *C04B 38/10* | (2006.01) |
| *C04B 38/06* | (2006.01) |

(52) U.S. Cl.
CPC ............ *C10C 3/002* (2013.01); *C04B 38/068* (2013.01); *C04B 38/0655* (2013.01); *C04B 38/103* (2013.01); *C10C 3/14* (2013.01)

(58) Field of Classification Search
CPC . B01D 15/08; B01J 20/20; B01J 20/28; B01J 20/205
USPC .......................................................... 264/44
See application file for complete search history.

(56) References Cited

U.S. PATENT DOCUMENTS

| | | | |
|---|---|---|---|
| 4,014,817 | A | 3/1977 | Johnson et al. |
| 4,619,805 | A | 10/1986 | Dias et al. |
| 6,033,506 | A | 3/2000 | Klett |
| 6,544,491 | B1 | 4/2003 | Stiller et al. |
| 6,797,251 | B1 | 9/2004 | Bennett et al. |
| 6,860,910 | B2 | 3/2005 | Rogers et al. |
| 7,767,183 | B2 | 8/2010 | Matviya |
| 8,226,816 | B2 | 7/2012 | Kennel et al. |
| 8,465,561 | B2 | 6/2013 | Stiller et al. |
| 2004/0177548 | A1 | 9/2004 | Rogers |
| 2004/0227879 | A1 | 11/2004 | Stiller et al. |

(Continued)

OTHER PUBLICATIONS

US 5,183,854 A1, 02/2001, Stiller et al. (withdrawn)

(Continued)

*Primary Examiner* — Jeffrey M Wollschager
*Assistant Examiner* — Xue H Liu
(74) *Attorney, Agent, or Firm* — Innovators Legal

(57) ABSTRACT

In one aspect, the disclosure relates to processes for preparation of a carbon foam material, the process comprising devolatization of coal-derived pitches or extracts at atmospheric pressure near green coke temperatures, thereby forming a solid coke-like material. In a further aspect, the process can further comprise grinding the solid coke-like material to a powder, providing the ground powder to a mold, and then reheating above green coking temperature (e.g., >600° C.) to further devolatize the material and form a porous solid foam material. The process further provides carbon materials such as carbon composite materials and sp2-hybridized carbon in the form of graphene oxide or graphene. In various aspects, the disclosure relates to the carbon foam and other materials prepared using the disclosed processes. This abstract is intended as a scanning tool for purposes of searching in the particular art and is not intended to be limiting of the present disclosure.

18 Claims, 18 Drawing Sheets

(56) References Cited

U.S. PATENT DOCUMENTS

2009/0061312 A1    3/2009    Zhamu et al.
2011/0189077 A1    8/2011    Theriault
2012/0097519 A1    4/2012    Stiller

OTHER PUBLICATIONS

German, Prediction of sintered density for bimodal power mixtures, Metallurgical Transactions, A 23.5: 1455-1465, pp. 1455 col. 1 par 2; pg. 1464 col. 1 para 2-3, 1992.

International Search Report for application PCT/US2019/026082, dated Jun. 20, 2019.

Yang et al., Carbon foam produced from fluid catalytic cracking slurry at atmospheric pressure, New Carbon Materials, vol. 23, No. 2, 2008.

PROCESSES AND COMPOSITIONS FOR CARBON FOAMS AND MATERIALS

BACKGROUND

Foams are described as porous solids. Carbon foams have been produced for several years. There are currently three basic processes for making foams. In the first, NMP soluble extracts from coal are heated to near 500° C. at 500 psig and foams are produced. The process devolatizes the extracts, with the remainder forming cross-links to yield a firm solid. The expelled volatiles create bubbles in the molten liquid extract. The external pressure prevents their rapid escape, so they form bubbles within the molten extract. As the extract further crosslinks the volatiles escape and a porous solid is produced. In a second currently available process, carbon-based foams, can be produced via pyrolization of foamed organic materials, such as polyurethane foams, to a carbon char. The skeleton of the foamed organic material remains intact and a carbon foam is produced. Finally, there are currently available processes to produce carbon foams from pitches, such as coal tar pitch, that are blended with ground coal. The blended pitch and ground coal mixture is then heated to nearly 500° C. under about 500 psig. In this process, similar to the first described process above, the pitch devolatilized. As the pitch devolatilizes, it is believed that the volatiles form a flux that promotes devolatilization and crosslinking within the coal articles. The result is a good quality carbon foam produced at relatively mild conditions.

However, the foregoing currently available processes for preparation of a carbon foam are limited by cost and/or scalability. Both the first and third processes described above are only feasible at a significantly elevated pressures. This requirement severely limits the dimensional scalability of the process. The second process described above utilizes a relatively costly material input, a foamed organic material, versus the wide-spread availability of coal materials at relatively low cost. Accordingly, there is a need to develop alternative and more cost-effective processes for producing carbon foam derived from coal. That is, new processes are required which reduced the capital cost and operating cost associated with carbon foam production. The availability of a more cost-effective process for producing carbon foam from coal would create new market opportunities for production of value-added products utilizing carbon foam.

Thus, despite advances in research directed to carbon foam materials, there remains a scarcity of processes to prepare carbon foam materials at low operating pressure and at reasonable cost. These needs and other needs are satisfied by the present disclosure.

SUMMARY

In accordance with the purpose(s) of the disclosure, as embodied and broadly described herein, the disclosure, in one aspect, relates to processes for preparation of a carbon foam material, the process comprising devolatization of coal-derived pitches or extracts at atmospheric pressure near green coke temperatures, thereby forming a solid coke-like material. In a further aspect, the process can further comprise grinding the solid coke-like material to a powder, providing the ground powder to a mold, and then reheating above green coking temperature (e.g., >600° C.) to further devolatize the material and form a porous solid foam material. The process further provides carbon materials such as carbon composite materials and sp2-hybridized carbon in the form of graphene oxide and/or graphene. In various aspects, the disclosure relates to the carbon foam and other materials prepared using the disclosed processes.

Disclosed are processes for producing a carbon foam material, the process comprising: a first heating step comprising heating a pitch material at a temperature of about 400° C. to about 700° C. under at a pressure of 0.5 atm to about 1.2 atm for about 4 hours to about 24 hours in a non-oxidizing atmosphere, thereby forming a foaming pitch material; grinding the foaming pitch material to a particle size of about 10 mesh to about 400 mesh, thereby forming foaming pitch particles; arranging the foaming pitch particles in a mold; and a second heating step comprising heating the mold at a temperature of greater than about 450° C. to about 750° C. at a pressure of about 0.5 atm to about 1.5 atm for about 0.25 hours to about 12 hours in a non-oxidizing atmosphere, thereby forming a carbon foam material.

In various aspects, the disclosed processes can be used to prepare a carbon foam material and a secondary carbon material, such as a graphene, a graphene oxide, a graphite, other sp2-hybridized carbon materials, and/or carbon foam composite materials.

Also disclosed are carbon foam materials prepared by the disclosed processes.

Also disclosed are carbon foam composite materials prepared by the disclosed processes.

While aspects of the present disclosure can be described and claimed in a particular statutory class, such as the system statutory class, this is for convenience only and one of skill in the art will understand that each aspect of the present disclosure can be described and claimed in any statutory class. Unless otherwise expressly stated, it is in no way intended that any process or aspect set forth herein be construed as requiring that its steps be performed in a specific order. Accordingly, where a process claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

BRIEF DESCRIPTION OF THE FIGURES

The accompanying figures, which are incorporated in and constitute a part of this specification, illustrate several aspects and together with the description serve to explain the principles of the disclosure.

Figure 1:
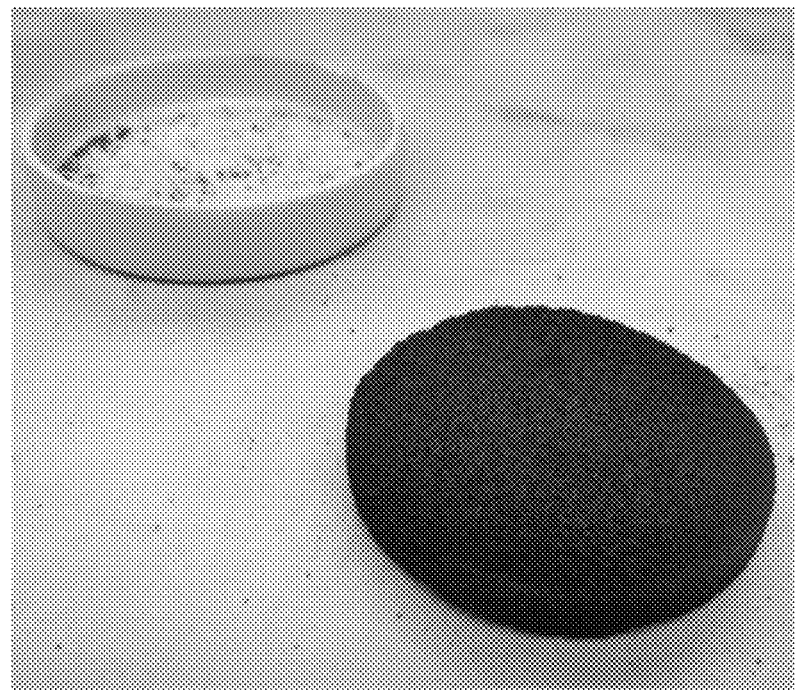
FIG. 1 shows a representative image of a disclosed 20-50 mesh particle size carbon foam prepared from lignite coal feedstock using a disclosed process described in Example 1.
Figure 2:
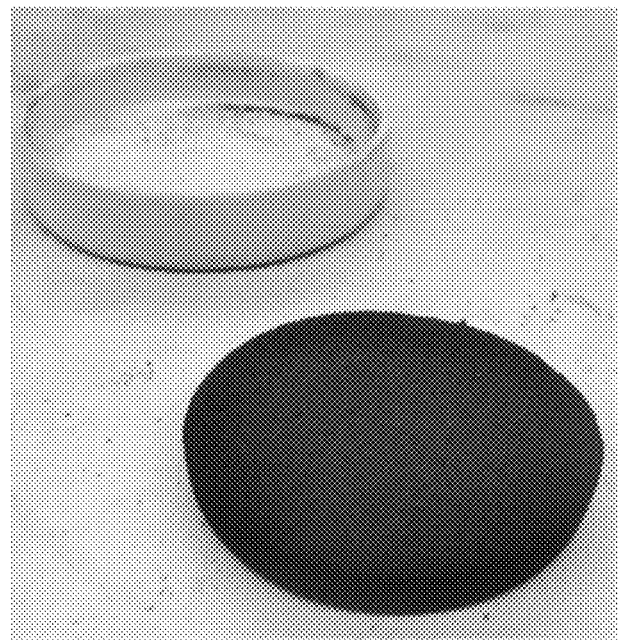
FIG. 2 shows a representative image of a disclosed 50-100 mesh particle size carbon foam prepared from lignite coal feedstock using a disclosed process described in Example 1.
Figure 3:
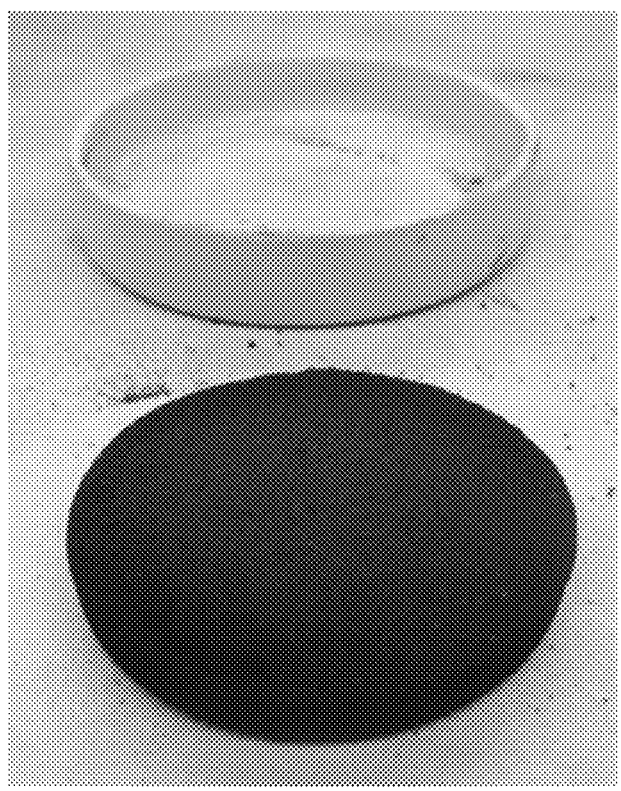
FIG. 3 shows a representative image of a disclosed ≤100 mesh particle size carbon foam prepared from lignite coal feedstock using a disclosed process described in Example 1.
Figure 4:
FIG. 4 shows a representative image of a disclosed graphene oxide which formed on the lid covering the ≤100 mesh particle size carbon foam prepared from lignite coal feedstock using a disclosed process described in Example 1.

Additional advantages of the disclosure will be set forth in part in the description which follows, and in part will be obvious from the description, or can be learned by practice of the disclosure. The advantages of the disclosure will be realized and attained by means of the elements and combinations particularly pointed out in the appended claims. It is to be understood that both the foregoing general description and the following detailed description are exemplary and explanatory only and are not restrictive of the disclosure, as claimed.

DETAILED DESCRIPTION

The disclosures herein will be described more fully hereinafter with reference to the accompanying drawings, in which some, but not all possible embodiments are shown. Indeed, disclosures may be embodied in many different forms and should not be construed as limited to the embodiments set forth herein; rather, these embodiments are provided so that this disclosure will satisfy applicable legal requirements. Like numbers refer to like elements throughout.

Many modifications and other embodiments disclosed herein will come to mind to one skilled in the art to which the disclosed compositions and methods pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of the appended claims. Although specific terms are employed herein, they are used in a generic and descriptive sense only and not for purposes of limitation.

It is also to be understood that the terminology used herein is for the purpose of describing particular aspects only and is not intended to be limiting. As used in the specification and in the claims, the term "comprising" can include the aspect of "consisting of." Unless defined otherwise, all technical and scientific terms used herein have the same meaning as commonly understood by one of ordinary skill in the art to which the disclosed compositions and methods belong. In this specification and in the claims which follow, reference will be made to a number of terms which shall be defined herein.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

All publications mentioned herein are incorporated herein by reference to disclose and describe the methods and/or materials in connection with which the publications are cited. The publications discussed herein are provided solely for their disclosure prior to the filing date of the present application. Nothing herein is to be construed as an admission that the present invention is not entitled to antedate such publication by virtue of prior invention. Further, the dates of publication provided herein can be different from the actual publication dates, which can require independent confirmation.

Prior to describing the various embodiments, the following definitions are provided and should be used unless otherwise indicated.

A. DEFINITIONS

Unless defined otherwise, all technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the specification and relevant art and should not be interpreted in an idealized or overly formal sense unless expressly defined herein.

As used herein, nomenclature for compounds, including organic compounds, can be given using common names, IUPAC, IUBMB, or CAS recommendations for nomenclature.

As used herein, "comprising" is to be interpreted as specifying the presence of the stated features, integers, steps, or components as referred to, but does not preclude the presence or addition of one or more features, integers, steps, or components, or groups thereof. Additionally, the term "comprising" is intended to include examples encompassed by the terms "consisting essentially of" and "consisting of." Similarly, the term "consisting essentially of" is intended to include examples encompassed by the term "consisting of."

As used in the specification and the appended claims, the singular forms "a," "an" and "the" include plural referents unless the context clearly dictates otherwise. Thus, for example, reference to "a carbon foam material," "a carbon pitch material," or "a pressure" includes mixtures of two or more such carbon foam materials, carbon pitch materials, or pressures, and the like.

Ranges can be expressed herein as from "about" one particular value, and/or to "about" another particular value. When such a range is expressed, a further aspect includes from the one particular value and/or to the other particular value. Similarly, when values are expressed as approximations, by use of the antecedent "about," it will be understood that the particular value forms a further aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

References in the specification and concluding claims to parts by weight of a particular element or component in a composition denotes the weight relationship between the element or component and any other elements or components in the composition or article for which a part by weight is expressed. Thus, in a compound containing 2 parts by weight of component X and 5 parts by weight component Y, X and Y are present at a weight ratio of 2:5, and are present in such ratio regardless of whether additional components are contained in the compound.

A weight percent (wt. %) of a component, unless specifically stated to the contrary, is based on the total weight of the formulation or composition in which the component is included.

A volume percent (% (v/v)) of a component, unless specifically stated to the contrary, is based on the total volume of the formulation or composition in which the component is included.

As used herein, the terms "optional" or "optionally" means that the subsequently described event or circumstance can or can not occur, and that the description includes instances where said event or circumstance occurs and instances where it does not.

Unless otherwise expressly stated, it is in no way intended that any process set forth herein be construed as requiring that its steps be performed in a specific order. Accordingly, where a process claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

B. PROCESSES FOR FORMING CARBON FOAMS

In accordance with the purpose(s) of the disclosure, as embodied and broadly described herein, the disclosure, in one aspect, relates to processes for preparation of a carbon foam material, the process comprising devolatization of coal-derived pitches or extracts at atmospheric pressure near green coke temperatures, thereby forming a solid coke-like material. In a further aspect, the process can further comprise grinding the solid coke-like material to a powder, providing the ground powder to a mold, and then reheating above green coking temperature (e.g., >600° C.) to further devolatize the material and form a porous solid foam material. The process further provides carbon materials such as carbon composite materials and sp2-hybridized carbon such as graphene oxide and/or graphene. In various aspects, the disclosure relates to the carbon foam and other materials prepared using the disclosed processes.

Disclosed are processes for producing a carbon foam material, the process comprising: a first heating step comprising heating a pitch material at a temperature of about 400° C. to about 700° C. under at a pressure of 0.5 atm to about 1.2 atm for about 4 hours to about 24 hours in a non-oxidizing atmosphere, thereby forming a foaming pitch material; grinding the foaming pitch material to a particle size of about 10 mesh to about 400 mesh, thereby forming foaming pitch particles; arranging the foaming pitch particles in a mold; and a second heating step comprising heating the mold at a temperature of greater than about 450° C. to about 750° C. at a pressure of about 0.5 atm to about 1.5 atm for about 0.25 hours to about 12 hours in a non-oxidizing atmosphere, thereby forming a carbon foam material.

In various aspects, the first heating step comprises heating a pitch material at a disclosed pressure, for a disclosed period of time, and at a temperature of about 400° C. to about 700° C.; about 500° C. to about 700° C.; about 500° C. to about 650° C.; about 550° C. to about 600° C.; about 550° C. to about 650° C.; about 400° C. to about 600° C.; about 400° C. to about 700° C.; a temperature or set of temperatures within any of the foregoing ranges of temperature; or an range of temperatures that is a sub-range of the foregoing ranges of temperature.

In various aspects, the first heating step comprises heating a pitch material at a disclosed temperature, for a disclosed period of time, and at a pressure of about 0.5 atm to about 1.2 atm; about 0.8 atm to about 1.2 atm; about 0.9 atm to about 1.1 atm; about 0.5 atm to about 1.0 atm; about 0.8 atm to about 1.0 atm; about 0.95 atm to about 1.0 atm; 0.90 atm to 0.95 atm; a pressure or set of pressures within any of the foregoing ranges of pressure; or an range of pressures that is a sub-range of the foregoing ranges of pressure.

In various aspects, the first heating step comprises heating a pitch material at a disclosed temperature, a disclosed pressure, and a period of time of about 4 hours to about 24 hours; about 6 hours to about 24 hours; 8 hours to 18 hours; 10 hours to 16 hours; a period of time or set of time periods within any of the foregoing ranges of time; or an range of time that is a sub-range of the foregoing ranges of time.

In various aspects, the second heating step comprises heating foaming pitch particles at a disclosed pressure, for a disclosed period of time, and at a temperature of about 400° C. to about 800° C.; about 450° C. to about 750° C.; about 500° C. to about 700° C.; about 500° C. to about 650° C.; about 550° C. to about 600° C.; about 550° C. to about 650° C.; about 400° C. to about 600° C.; about 400° C. to about 700° C.; a temperature or set of temperatures within any of the foregoing ranges of temperature; or an range of temperatures that is a sub-range of the foregoing ranges of temperature. In a further aspect, the second heating step comprises heating the foaming pitch particles at a disclosed pressure, for a disclosed period of time, and at a temperature of about 450° C. to about 750° C. In a still further aspect, the second heating step comprises heating the foaming pitch particles at a disclosed pressure, for a disclosed period of time, and at a temperature of about 500° C. to about 700° C. In a yet further aspect, the second heating step comprises heating the foaming pitch particles at a disclosed pressure, for a disclosed period of time, and at a temperature of about 550° C. to about 650° C.

In various aspects, the second heating step comprises heating the foaming pitch particles at a disclosed temperature, for a disclosed period of time, and at a pressure of about 0.5 atm to about 1.5 atm; about 0.5 atm to about 1.2 atm; about 0.8 atm to about 1.2 atm; about 0.9 atm to about 1.1 atm; about 0.5 atm to about 1.0 atm; about 0.8 atm to about 1.0 atm; about 0.95 atm to about 1.0 atm; 0.90 atm to 0.95 atm; a pressure or set of pressures within any of the foregoing ranges of pressure; or an range of pressures that is a sub-range of the foregoing ranges of pressure. In a further aspect, the second heating step comprises heating the foaming pitch particles at a disclosed temperature, for a disclosed period of time, and at a pressure of about 0.5 atm to about 1.5 atm. In a still further aspect, the second heating step comprises heating the foaming pitch particles at a disclosed temperature, for a disclosed period of time, and at a pressure of about 0.8 atm to about 1.2 atm. In a yet further aspect, the second heating step comprises heating the foaming pitch particles at a disclosed temperature, for a disclosed period of time, and at a pressure of about 0.8 atm to about 1.0 atm.

In various aspects, the second heating step comprises heating the foaming pitch particles at a disclosed temperature, a disclosed pressure, and a period of time of about 0.25 hours to about 12 hours; 0.5 hours to about 12 hours; about 1 hour to about 12 hours; about 0.25 hours to about 8 hours; 0.5 hours to about 8 hours; about 1 hour to about 8 hours; about 0.25 hours to about 4 hours; 0.5 hours to about 4 hours; about 1 hour to about 4 hours; a period of time or set of time periods within any of the foregoing ranges of time; or an range of time that is a sub-range of the foregoing ranges of time. In a further aspect, the second heating step comprises heating the foaming pitch particles at a disclosed temperature, a disclosed pressure, and a period of time of about 0.25 hours to about 12 hours. In a still further aspect, the second heating step comprises heating the foaming pitch particles at a disclosed temperature, a disclosed pressure, and a period of time of about 0.5 hours to about 8 hours. In a still further aspect, the second heating step comprises heating the foaming pitch particles at a disclosed temperature, a disclosed pressure, and a period of time of about 1 hour to about 4 hours.

In various aspects, the non-oxidizing atmosphere can comprise oxygen present in an amount less than or equal to about 10% (v/v); about 9% (v/v); about 8% (v/v); about 7% (v/v); about 6% (v/v); about 5% (v/v); about 4% (v/v); about 3% (v/v); about 2.5 (v/v); about 2% (v/v); about 1.5% (v/v); about 1% (v/v); about 0.5% (v/v); a percentage (v/v) of oxygen value or set of percentage of oxygen values within any of the foregoing ranges of percentage of oxygen values; or a range of percentage of oxygen values that is a sub-range of the foregoing ranges of percentage of oxygen values. In a further aspect, the non-oxidizing atmosphere is essentially oxygen free.

In various aspects, the non-oxidizing atmosphere in the first heating step comprises one or more inert gases; and wherein the inert gas is argon, nitrogen, or a mixture of both in an amount that is greater than about 70% (v/v). In a further aspect, the amount of inert gas in the non-oxidizing atmosphere comprises greater than about 75% (v/v); about 80% (v/v); about 85% (v/v); about 90% (v/v); about 95% (v/v); about 96% (v/v); about 97% (v/v); about 98% (v/v); about 99% (v/v); a percentage (v/v) value of inert gas or set of percentage (v/v) of values of inert gas within any of the foregoing ranges of inert gas values; or a range of percentage of inert gas values that is a sub-range of the foregoing ranges of percentage of inert gas values.

In various aspects, the process can further comprise calcining the carbon foam material at a temperature of about 800° C. to about 1200° C. for about 0.5 hours to about 12 hours in a non-oxidizing atmosphere. In a further aspect, the calcining can be carried out for a disclosed period of time at a temperature of about 800° C. to about 1200° C.; about 800°

C. to about 1100° C.; about 800° C. to about 1000° C.; about 900° C. to about 1200° C.; about 900° C. to about 1100° C.; about 900° C. to about 1000° C.; about 950° C. to about 1200° C.; about 950° C. to about 1100° C.; about 950° C. to about 1100° C.; a temperature or set of temperatures within any of the foregoing ranges of temperature; or an range of temperatures that is a sub-range of the foregoing ranges of temperature. In a still further aspect, the calcining can be carried out at a disclosed temperature for a period of time of about 1 hours to about 12 hours; about 2 hours to about 12 hours; about 3 hours to about 12 hours; about 4 hours to about 12 hours; about 5 hours to about 12 hours; about 6 hours to about 12 hours; about 0.5 hours to about 10 hours; about 1 hours to about 10 hours; about 2 hours to about 10 hours; about 3 hours to about 10 hours; about 4 hours to about 10 hours; about 5 hours to about 10 hours; about 6 hours to about 10 hours; about 0.5 hours to about 8 hours; about 1 hours to about 8 hours; about 2 hours to about 8 hours; about 3 hours to about 8 hours; about 4 hours to about 8 hours; about 5 hours to about 8 hours; about 6 hours to about 8 hours; a period of time or set of time periods within any of the foregoing ranges of time; or an range of time that is a sub-range of the foregoing ranges of time.

In various aspects, the non-oxidizing atmosphere used in the calcining step can comprise oxygen present in an amount less than or equal to about 10% (v/v); about 9 (v/v); about 8% (v/v); about 7% (v/v); about 6% (v/v); about 5% (v/v); about 4% (v/v); about 3% (v/v); about 2.5% (v/v); about 2% (v/v); about 1.5% (v/v); about 1% (v/v); about 0.5% (v/v); a percentage (v/v) of oxygen value or set of percentage of oxygen values within any of the foregoing ranges of percentage of oxygen values; or a range of percentage of oxygen values that is a sub-range of the foregoing ranges of percentage of oxygen values. In a further aspect, the non-oxidizing atmosphere in the calcining step is essentially oxygen free.

In various aspects, the non-oxidizing atmosphere used in the calcining step can comprise one or more inert gases; and wherein the inert gas is argon, nitrogen, or a mixture of both in an amount that is greater than about 70% (v/v). In a further aspect, the amount of inert gas in the non-oxidizing atmosphere comprises greater than about 75% (v/v); about 80% (v/v); about 85% (v/v); about 90% (v/v); about 95% (v/v); about 96% (v/v); about 97% (v/v); about 98% (v/v); about 99% (v/v); a percentage (v/v) value of inert gas or set of percentage (v/v) of values of inert gas within any of the foregoing ranges of inert gas values; or a range of percentage of inert gas values that is a sub-range of the foregoing ranges of percentage of inert gas values.

In various aspects, the ground foaming pitch material has a particle size of about 10 mesh; about 20 mesh; about 30 mesh; about 40 mesh; about 50 mesh; about 60 mesh; about 70 mesh; about 80 mesh; about 90 mesh; about 100 mesh; about 110 mesh; about 120 mesh; about 130 mesh; about 140 mesh; about 150 mesh; about 160 mesh; about 170 mesh; about 180 mesh; about 190 mesh; about 200 mesh; about 210 mesh; about 220 mesh; about 230 mesh; about 240 mesh; about 250 mesh; about 260 mesh; about 270 mesh; about 280 mesh; about 290 mesh; about 300 mesh; about 310 mesh; about 320 mesh; about 330 mesh; about 340 mesh; about 350 mesh; about 360 mesh; about 370 mesh; about 380 mesh; about 390 mesh; about 400 mesh; a range encompassed by any combination of the foregoing values; or any set of the foregoing values.

In various aspects, the ground foaming pitch material has a particle size of about 10 mesh to about 400 mesh; about 10 mesh to about 200 mesh; about 10 mesh to about 100 mesh; about 20 mesh to about 400 mesh; about 20 mesh to about 200 mesh; about 20 mesh to about 100 mesh; about 50 mesh to about 400 mesh; about 50 mesh to about 200 mesh; about 50 mesh to about 100 mesh; and combinations thereof. In a further aspect, the ground foaming pitch material is a homogeneous mixture of a first ground foaming pitch material having a particle size of about 10 mesh to about 400 mesh; about 10 mesh to about 200 mesh; about 10 mesh to about 100 mesh; about 20 mesh to about 400 mesh; about 20 mesh to about 200 mesh; about 20 mesh to about 100 mesh; about 50 mesh to about 400 mesh; about 50 mesh to about 200 mesh; about 50 mesh to about 100 mesh; and a second ground foaming pitch material having a particle size of about 10 mesh to about 400 mesh; about 10 mesh to about 200 mesh; about 10 mesh to about 100 mesh; about 20 mesh to about 400 mesh; about 20 mesh to about 200 mesh; about 20 mesh to about 100 mesh; about 50 mesh to about 400 mesh; about 50 mesh to about 200 mesh; about 50 mesh to about 100 mesh; provided that the first ground foaming pitch material and the second ground foaming pitch material have different particle size ranges. In a still further aspect, the first ground foaming pitch material is present in an amount of about 10 wt % to about 90 wt % and the second ground foaming pitch material of about 90 wt % to about 10 wt %, or a sub-range within the foregoing ranges.

In various aspects, the process can further comprise the steps of preparing a foam pitch material. For example, the processes described herein below for preparation of a foam material, or alternatively, pitch production processes described in U.S. Pat. No. 8,226,816 and U.S. patent application Ser. Nos. 13/166,229 and 14/513,745, each of which is incorporated by reference in their entirety. In a further aspect, a foaming pitch material can be prepared from coal derived mesophase pitch produced using a coal conversion process described in U.S. Pat. No. 8,226,816 and U.S. patent application Ser. Nos. 13/166,229 and 14/513,745.

The disclosed process is believed to dramatically reduce the cost of carbon foam production, both in capital and operating cost. The disclosed processes provide a carbon foam material prepared, in part, via devolatization of a foaming pitch at atmospheric pressure. The process begins by heating coal derived pitches or extracts to near green coke temperatures. This partially devolatilizes the pitch and forms a solid coke like material but it still has significant remaining volatiles with high boiling points. The "near coke' is then ground to a powder. The powder can be provided to a mold and then reheated to above green coking temperature greater than about 600° C. The second devolatization step completes the devolatilization process and as the volatiles leave the molten liquid, bubbles are formed, and the liquid crosslinks to so that upon cooling, a porous solid, foam is provided.

In various aspects, the disclosed processes can be used to prepare a carbon foam material and a secondary carbon material, such as a graphene, a graphite, a sp2-hybridized carbon material, and/or carbon foam composite materials.

Also disclosed are carbon foam materials prepared by the disclosed processes.

Also disclosed are carbon foam composite materials prepared by the disclosed processes.

In various aspects, the present disclosure provides processes that allows for carbon foams to be produced from low quality feedstock coals, as well as higher quality coals, at a significant reduction in cost. The disclosed process provides carbon foams via steps that operate at atmospheric pressure, which thereby allows a carbon foam to be produced directly in molds.

In a further aspect, additional carbon materials can be produced using the disclosed processes such as graphene, graphene oxide, graphite flakes, composite carbon foam, and/or "graphene oxide fibers". Graphene oxide fiber is the name given to the material formed in the disclosed processes when a graphene oxide film was disrupted. Disruption of a graphene film results in the film tightly rolling onto itself in a cylindrical shape to form fiber-like structures. Graphene oxide is a product of the disclosed processes. Without wishing to be bound by a particular theory, it is believed that the reduction or elimination of oxygen in the foaming environment results in production of graphene. While the carbon foam is the primary product, the conditions and feedstocks can be altered to increase the yield of these additional carbon material products.

In various aspects, the disclosed processes comprise heating a pitch to about 500° C. to provide a material referred herein as a "foaming pitch material," (or alternatively referred to as "near-green coke") which comprises volatiles within the foaming pitch material structure. In a further aspect, the foaming pitch is ground to a specific particle size. In a still further aspect, the ground particles are provided to a mold form. After the mold form is filled, it is heated to above temperature greater than 500° C. at atmospheric pressure. The heating at atmospheric pressure can be carried out in a non-oxidizing environment or essentially non-oxidizing environment. As the heating proceeds, the foaming pitch devolatilizes. Without wishing to be bound by a particular theory, it is believed that the volatiles act as a flux that facilitates the melting and/or crosslinking of the remaining carbon. The volatiles acting as a flux facilitate the particles of the remaining coke fusing to form a porous carbon solid or foam. The resulting foam can be further heated to calcination temperatures where it undergoes some shrinkage at a predictable rate. The further heating to calcination temperatures increases the hardness and strength of the foam. In a still further aspect, the disclosed foam formed using the disclosed processes can act as an electrical conductor. In a yet further aspect, the disclosed foam formed using the disclosed processes is a nonflammable material. The disclosed processes provide routes to preparing carbon foam and other carbon materials utilizing as material inputs readily-available bituminous, sub-bituminous, and lignite coals.

Figure 20:
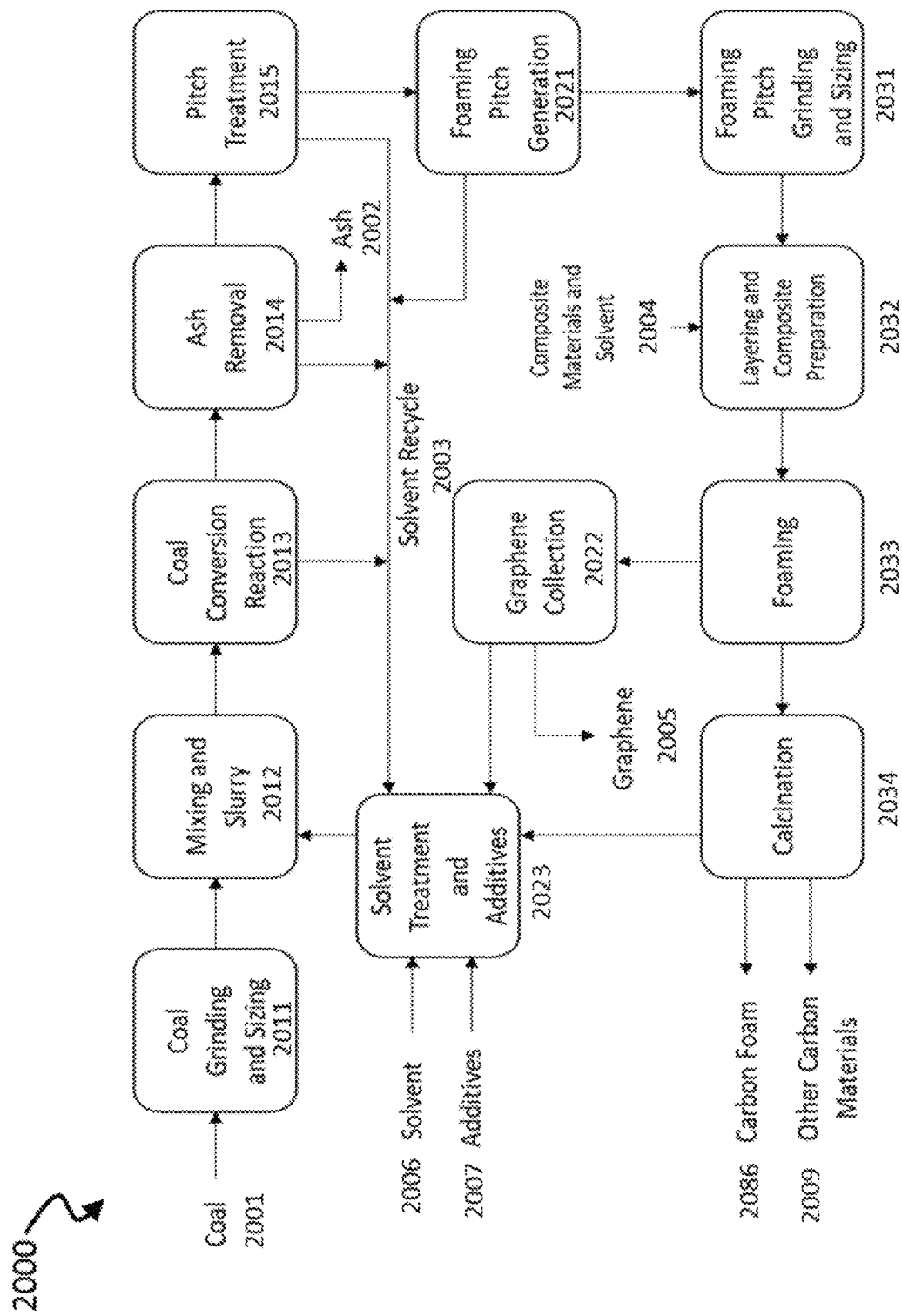
FIG. 20 shows a block flow diagram for a representative disclosed process for preparation of carbon foam and other disclosed products from coal.
Figure 21:
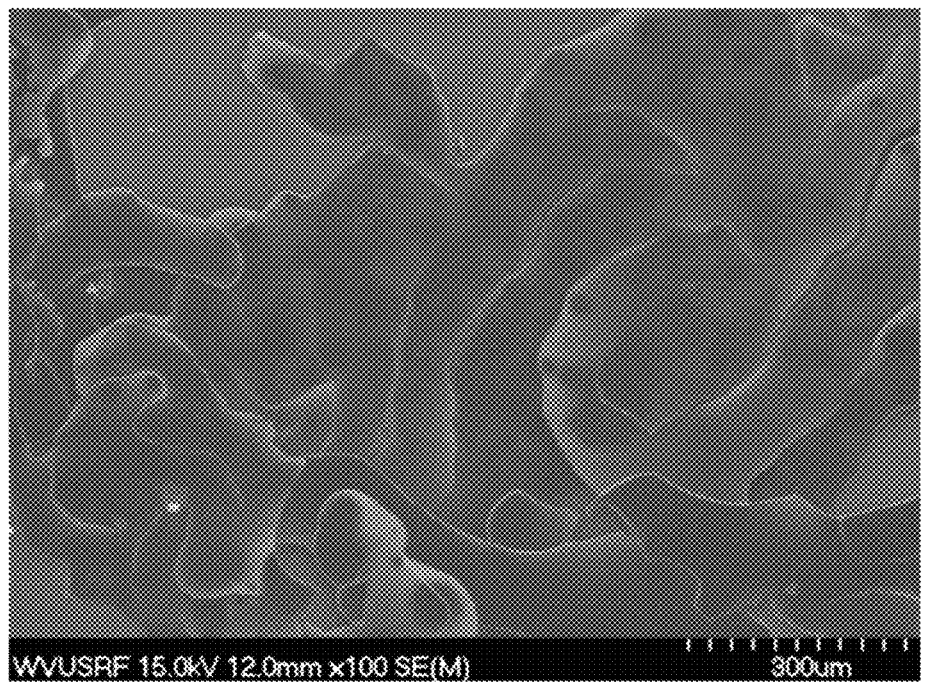
FIG. 21 shows a representative scanning electron micrograph (SEM) image of a disclosed graphene oxide formed in the vapor phase using a disclosed process described in Example 1.
Figure 22:
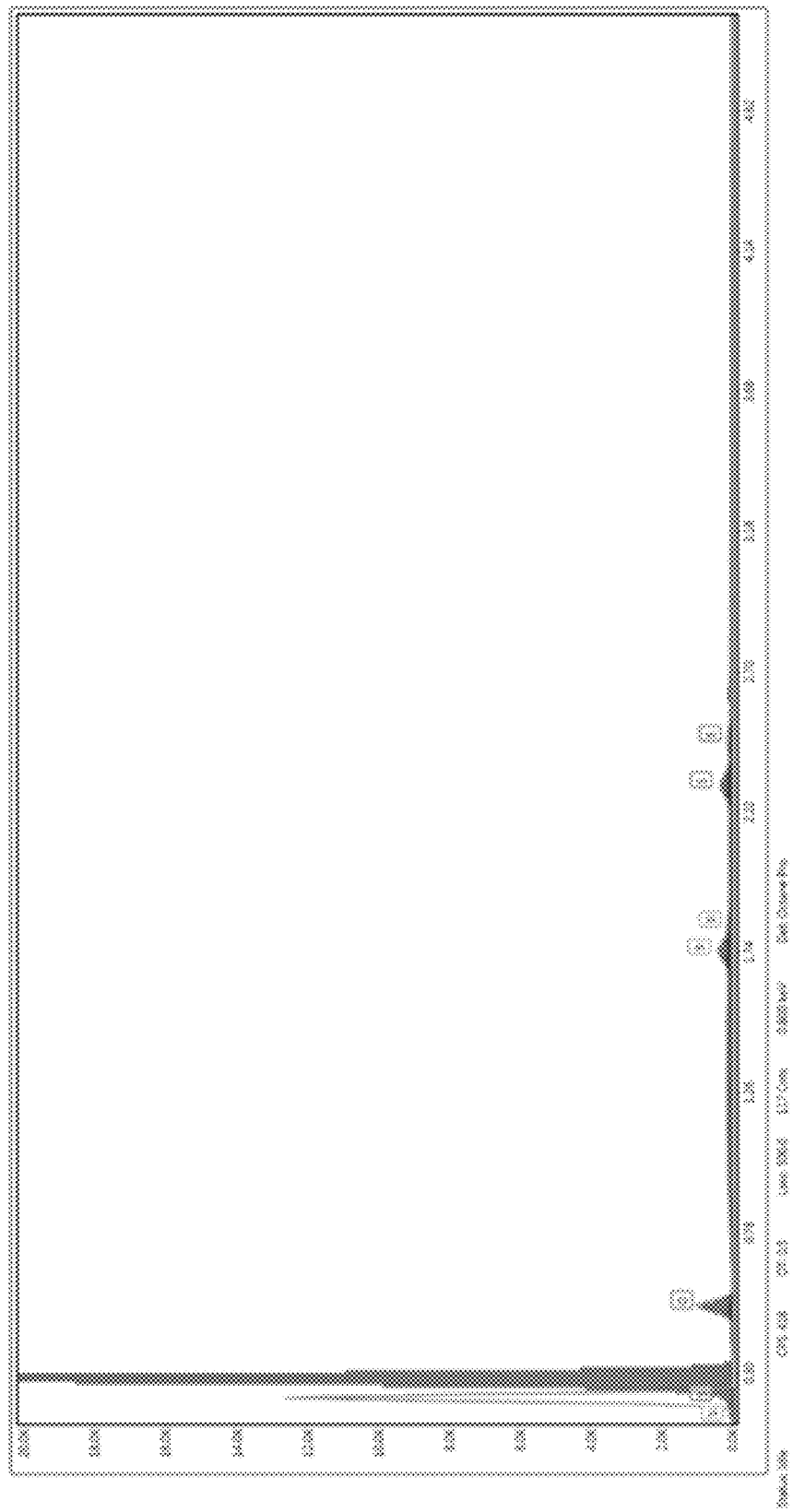
FIG. 22 shows representative elemental analysis data of the graphene oxide shown in FIG. 21. The data show that the material comprises carbon and oxygen.
Figure 23:
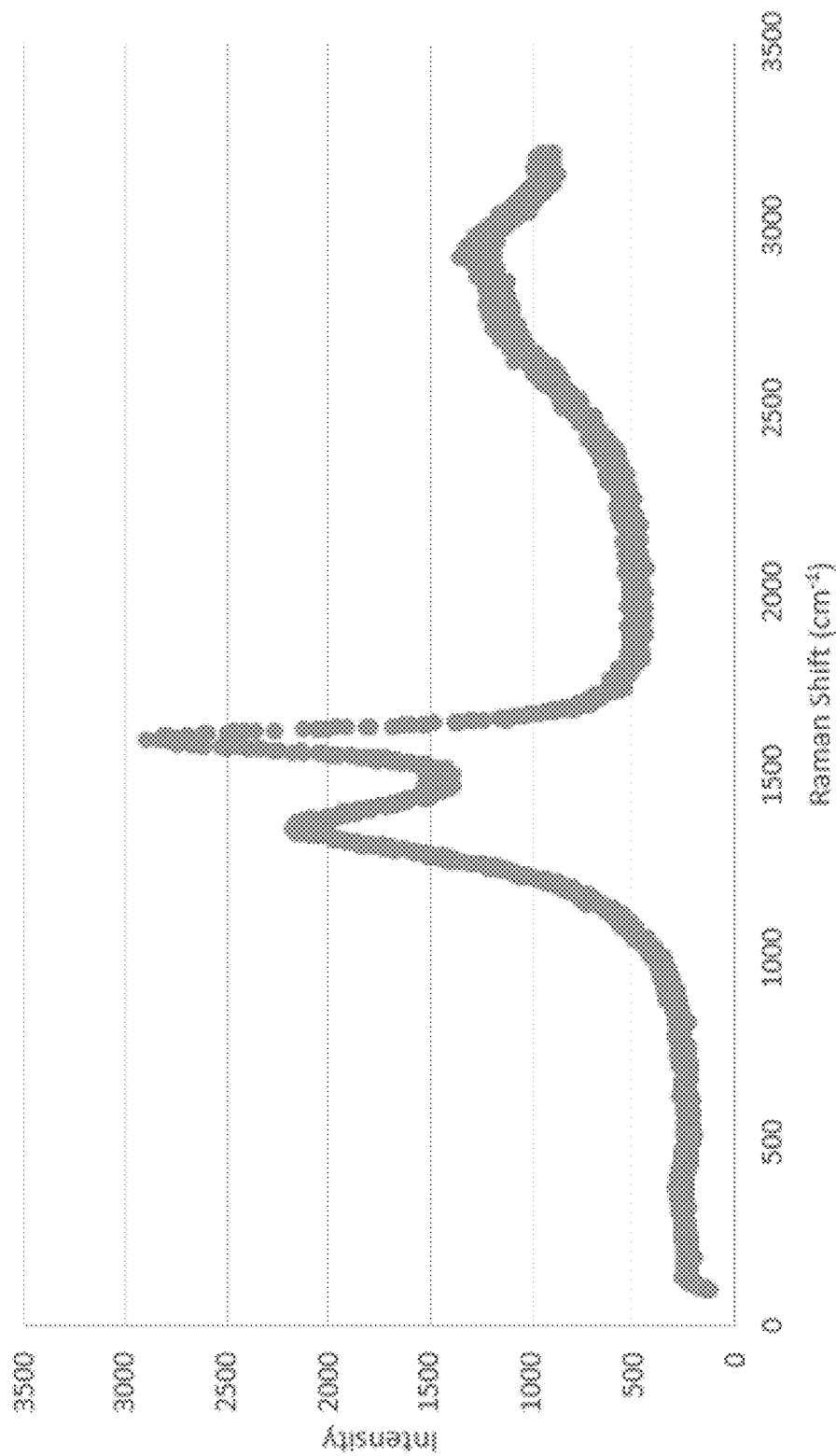
FIG. 23 shows representative Raman spectra data of the material shown in FIGS. 21 and 22. The Raman spectra data are consistent with the material being a graphene oxide.
Figure 24:
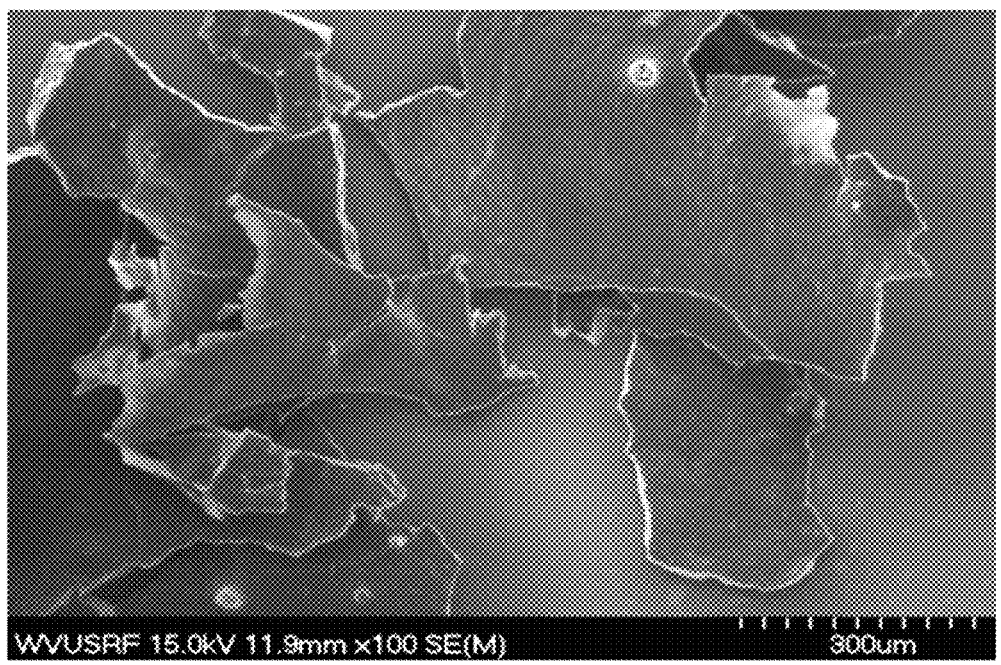
FIG. 24 shows a representative scanning electron micrograph (SEM) image of disclosed $sp^2$ carbon material formed in the solid/liquid phase that occurs under the carbon foam in the disclosed processes.
Figure 25:
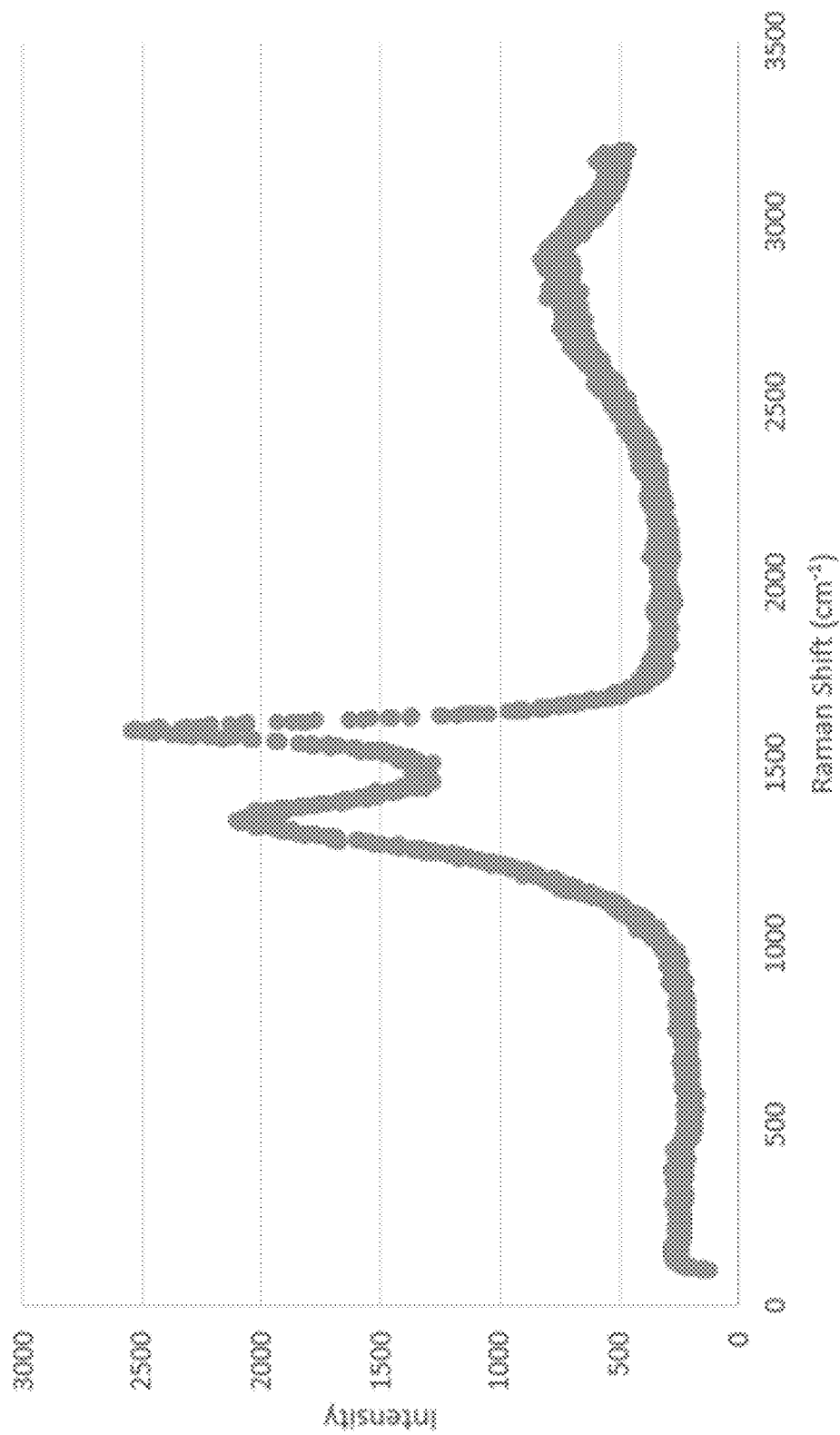
FIG. 25 shows representative Raman spectra data of the material shown in FIG. 24. The Raman spectra data are consistent with the material being a graphene oxide.

In various aspects, referring now to FIG. 20, a disclosed process for producing carbon foam and other carbon materials from a carbon input material is shown in the block flow diagram, 2000. In an aspect, the carbon input material can be a coal, 2001, such as a bituminous, sub-bituminous, and lignite coal. In a further aspect, the carbon input material can be a coal extract or coal pitch material. In some aspects, the disclosed process begins with grinding, 2011, the carbon input material, such as a coal, to a particle size of about 5 mesh to about 150 mesh. The ground carbon input material is suspended in a carbon input material solvent to form a slurry, 2012. In various aspects, the carbon input material solvent comprises condensed coal volatiles recycled through a coal conversion process. The process can further comprise an additive material. The additive is believed to donate hydrogen in the conversion reaction and alter the viscosity of the post-reaction mixture. In various aspects, the additive can comprise a hydrogenated vegetable oil, a petroleum products such as kerosene, or mixtures thereof. The coal slurry formed from the ground carbon input material, the carbon input material solvent, and optionally, the additive material, is then transferred into a coal conversion reactor for carrying out the coal conversion reaction, 2013.

In the coal conversion reaction, 2013, the coal slurry is converted to a mixture of low softening point carbon pitch, coal volatiles, and ash material using mild reaction conditions relative to conventional direct coal liquefaction processes. Direct coal liquefaction processes typically utilize reaction conditions comprising temperatures ranging from 450-600° C. and pressures ranging from 200 psi to 700 psi. Small amounts of gases are also produced in the conversion reaction in the form of carbon monoxide, carbon dioxide, hydrogen sulfide, and other gases. This aspect of the conversion reaction increases the quality of the carbon pitch produced through the removal of sulfur inherent in the coal. Coal volatiles in the vapor phase and gases produced are removed from the reactor. The coal volatiles are condensed and collected for the solvent recycle and the off gases produced are sent to the scrubbing tower.

The post-reaction mixture follows a temperature viscosity relationship such that at an appropriate temperature, the mixture has low viscosity similar to water. The post-reaction mixture typically reaches low viscosities at temperatures ranging from 50-200° C. based on the reaction conditions and additives disclosed herein. In various aspects, an appropriate temperature for ash removal, 2014, is about 100 to about 150° C., wherein solid mineral matter or ash, 2002, is removed through gravity separation based on the specific gravity of the solid ash particles. Ash removal, 2014, can further comprise filtration of the ash material, 2002, such that ash can be removed below the levels of detectability. In the ash removal step, 2014, unreacted coal from the conversion reaction can also removed. Following ash removal, the post-reaction material is in the form of solution comprising low softening point pitch and coal volatiles with reduced ash material.

The solution comprising low softening point pitch and coal volatiles is processed into higher softening point pitch using a vacuum distillation process, 2015. In this step of the process, the solution is subjected to vacuum conditions and heated in order to drive off volatiles and create a higher softening point pitch with a lower volatile content. The vacuum ranges from about 25 torr to about 100 torr and the temperature ranges from about 280° C. to about 320° C. During this process, an inert gas such as nitrogen or argon is mildly bubbled through the solution. This helps to agitate the pitch as it is processed as well as assist the volatiles in escaping the pitch in the vapor phase and exiting the distillation column. During the processing where the pitch is exposed to heat and attains a liquid phase, the pitch orients to a more two dimensional nature. In some aspects, an anisotropic pitch is formed. The release of the volatiles and mild inert gas sparge can assist in orienting the pitch towards an anisotropic nature.

Additional enhancements to the quality of the pitch can be performed in this step by bubbling hydrogen gas through the pitch as well as isolating the pitch in a heated and inert environment and allowing the molecules to orient in the liquid phase. Once the pitch is removed from the distillation vessel, it is allowed to cool to room temperature where it becomes a solid. In a conventional commercial application, the pitch can be transferred in the liquid phase to the foaming pitch vessel.

The next process step, foaming pitch generation, 2021, comprises heating the pitch in a foaming pitch vessel at temperatures of about 450 to about 550° C. under a very slight vacuum to assist the volatiles driven off in exiting the vessel. An inert gas such as nitrogen or argon is can be purged through the vessel to assist the escaping volatiles and maintain a nonoxidizing environment. The additional volatiles removed create a pitch which is partially coked. However, the pitch does maintain a high enough volatile content to fuse together in the atmospheric pressure foaming step.

In various aspects, the level of volatiles remaining in the foaming pitch can determines the relative amounts of the different carbon materials produced in the foaming step, 2033. In the foaming step, 2033, in addition to the carbon foam produced, graphene and/or graphene oxide can also deposited on the surfaces which contact the volatiles driven off in the foaming step. Therefore, a higher volatile content in the foaming pitch would result in a greater amount of volatiles driven off in the foaming step and ultimately a higher yield of graphene and/or graphene oxide. In addition, the higher volatile content creates a layer of liquid at the outside surface of the foam during the foaming step. Depending upon the thickness of the liquid layer, different types of sp2 hybridized carbon materials can be produced such as graphene, graphene oxide, graphite, and/or graphite flakes. In some aspects, sp2 hybridized carbon materials can be collected. In a further aspect, sp2 hybridized carbon materials can fuse to the carbon foam to form a composite carbon material.

The foaming pitch produced in the foaming pitch generation step, 2021, is then ground to appropriate particle sizes in the foaming pitch grinding and sizing step, 2031, to provide foaming pitch particles. The foaming pitch is ground to a size of about 10 mesh to about 200 mesh. The foaming pitch particles are then separated in the different particle size ranges. The carbon foam material formed in the disclosed process results, at least in part, from fusion of the foaming pitch particles in the presence of the remaining volatiles in the foaming pitch. Accordingly, different particle size ranges can change the characteristics of the foam produced. For example, the particle size of ≤200 mesh would form a much more tightly compact foam the smaller pore sizes than foam produced from the particle size range between about 20 mesh and about 50 mesh. In addition to altering the characteristics of the foam produced, the particle size also affects the secondary products of the foaming step.

As shown in the block diagram, 2000, after the foaming pitch grinding and sizing step, 2031, the foaming pitch particles can be prepared for the foaming step in the layering and composite preparation step, 2032. In various aspects, the foaming pitch particles can be provided into any mold, and following foaming, the shape conferred by the mold will be maintained. In contrast to conventional processes of producing carbon foam, the disclosed processes comprise a foaming step carried out at atmospheric pressure and does not require a material expansion step in order to produce a foam. Therefore, in a commercial application the ground and sized foaming pitch particles can be continuously fed into the furnace for the foaming step or can be injected into molds to make carbon foam of specific shapes and the molds fed through the furnace. In various aspects, the layering and composite preparation step, 2032, can comprise a mold that itself can be made from carbon fibers. Accordingly, composite carbon materials can be produced and fused together during the foaming step wherein the composite comprises the mold fused, at least in part, to the foaming pitch particles.

The foaming step, 2033, is distinct from conventional process in that it is carried out at or near atmospheric pressure. In contrast, the foaming step of conventional processes for producing carbon foam is carried by heating the pitch under pressures between 500-1000 psi, which prevent the volatiles from escaping at the elevated temperatures. The pressure is then released and the pitch rapidly devolatilizes and a solid foam is produced. This is referred to as the expansion step in traditional foaming processes.

A significant shortcoming of conventional processes for producing carbon foams is that they are not amenable to embedding the carbon foam with any materials that would be useful in preparing a composite carbon foam. That is, in conventional processes for producing carbon foams, attempting to embed carbon fibers or other materials in the foam would disrupt the expansion step and create weaknesses and inconsistencies in the carbon foam around the embedded material by altering the path of escaping volatiles. Furthermore, in conventional foaming processes the pitch is heated under pressure to a liquid state. Therefore, in conventional foaming processes, any attempt to embed a material in the foam, such as diamond powder, would produce a foam in which the embedded materials are inconsistently distributed in the foam. That is, in conventional processes, once the pitch reaches a liquid state, the embedded particles are free to move. Since diamond has a greater specific gravity than the pitch, the diamonds would fall to the bottom of the pitch and not disperse evenly.

The processes described in the present disclosure provide carbon foams wherein the foaming pitch particles are fused together. Therefore, any embedded material can be evenly dispersed in the foaming pitch particles. During the foaming step the embedded materials would remain evenly dispersed in the foaming pitch particles, and subsequently fused into the carbon foam material. Moreover, the disclosed processes for producing carbon foam comprises fusing the foaming pitch particles together. Moreover, the pores in the carbon foam materials, prepared using the disclosed process, are created from the void space of the packed foaming pitch particles. Therefore, any embedded material is able to fuse into the foam without the type of material or structural inconsistencies that would be created in the expansion step of conventional processes.

In various aspects, the disclosed processes provide for preparing a carbon foam material from foaming pitch particles and additional materials to form carbon composite materials. In an aspect, the disclosed processes can be used to produce a composite by utilizing a foaming pitch particle comprising a higher volatile content. In a further aspect, the disclosed processes can further comprise the use of a foaming pitch particle comprising a higher volatile content. Without wishing to be bound by a particular theory, it is believed that a foaming pitch particle comprising a higher volatile content is able to provide a layer of sp2 hybridized carbon along the outside surface of the foam which contacts the mold or container. In an even further aspect, the disclosed processes can further comprise producing a carbon composite materials, wherein the disclosed processes further comprise layering foaming pitch particles having different particle size ranges or even using foaming pitch derived using other conditions or even from other coals.

In various aspects the disclosed processes can be used to provide composite materials, wherein the disclosed processes further comprise one or more steps of placing layers of carbon fibers into the foaming pitch particles to form a carbon fiber/carbon foam composite with enhanced strength properties. In a yet further aspect, the disclosed processes can further comprise a step of wetting the surface of the foaming pitch particles with recycled solvent from the coal conversion process or other form of liquid hydrocarbon. In an aspect, the wetting agent can be phenanthrene, a material that is recovered in the distillation volatiles from bituminous and subbituminous coals. The process, in a further aspect, can further comprise placing a layer of foaming pitch particles over a layer of wetted foaming pitch particles. Alternatively, in an aspect, the layer of wetted foaming pitch particles can remain exposed. Without wishing to be bound by a particular theory, it is believed that leaving a layer of wetted foaming pitch particles exposed would result in a carbon foam with layers of sp2 carbon embedded in the foam.

In various aspects, the disclosed processes can be used to prepare the composite material comprising a carbon foam material comprising diamond dust or diamond powder. That is, the disclosed processes can further comprise a step of forming a layer or mixture of foaming pitch particles and diamond dust or diamond powder. A disclosed carbon foam material comprising diamond dust or diamond powder can have enhanced mechanical and thermal properties compared to a carbon foam without diamond dust or diamond powder.

During the foaming step, 2033, the foaming pitch particles are fused together. Since the foaming pitch has already been heated to temperatures around 500° C., in the foaming pitch generation step, 2021, the temperature can be ramped quickly to around 500° C. The temperature is then increased at a slower rate between the temperatures of about 500 to about 700° C. In this temperature range, the escaping volatiles collect on surfaces to form graphene and/or graphene oxide. The graphene and/or graphene oxide formed can be collected using a graphene/graphene oxide collector in the graphene collection step, 2022. A graphene collector can consist of stacks or layers of surfaces placed in the stream of escaping volatiles upon which the graphene and/or graphene oxide can collect.

The carbon foam material can optionally be subjected to calcination, 2034. In an alternative aspect, the carbon foam material can be calcined by further heating in the furnace to calcination temperatures of greater than 900° C. Following the calcination step, 2034, graphene, graphene oxide, graphite, and/or graphite chips can be separated and collected as a product.

The foaming furnace used in the foaming step, 2033, is a piece of equipment designed for continuous operation for producing carbon foam using the disclosed processes. The foaming furnace comprises a moving belt or conveyor carrying the foaming pitch directly into a heating chamber or carrying molds with foaming pitch particles into a heating chamber. As the foaming pitch travels through the heating chamber, the temperature of the heating chamber can be configured to gradually increase the temperature along the travel path of the moving belt with the temperature lowest at the entry point and greatest near the exit point. Such as design allows for the temperature of the foaming step to be gradually increased throughout the residence time in the heating chamber. In addition, a heated inert gas can be purged through the heating chamber to maintain a nonoxidizing environment and facilitate transferring the volatiles to the graphene/graphene oxide collector.

The graphene/graphene oxide collector unit used in the graphene collection step, 2022, is a piece of equipment comprising tightly packed surfaces with a large exposed surface area where the graphene and/or graphene oxide can contact the surface and form the sp2-hybridized carbon material. In an aspect, the tightly packed service areas can be in cartridges that can be removed from the vapor flow and replaced with a new cartridge. The flow rate and residence time for the graphene/graphene oxide collector can be designed to recover the greatest yield.

In a continuous process, using the disclosed processes to prepare composite foam materials can utilize a composite foam unit. In some aspects, the composite foam unit can prepare carbon fiber embedded carbon foam. Alternatively, the composite foam unit can also be used to produce other composites such as carbon foam comprising sp2 hybridized carbon. In operation, the composite foam unit would be configured to distribute ground and sized foaming pitch particles onto a flat sheet. The composite foam unit is configured to convey the flat sheet comprising the foaming pitch particles along a conveyor to a furnace or heating chamber for foam. Prior to entering the furnace, the flat sheet comprising the foaming pitch particles passes under a roller with stretched carbon fibers, followed by addition of foaming pitch particles distributed on top of the fibers prior to entering the furnace. The composite foam unit can be further configured with spray nozzles to wet the surface of the foaming pitch with coal or petroleum volatiles to facilitate formation of a composite material comprising carbon foam and sp2 hybridized carbon materials. In various aspects, the composite foam unit can be configured to repeat the foregoing steps a plurality of cycles in order to fabricate layers of foaming pitch particles and other materials, such as carbon fibers, diamond particles, and the like.

Before proceeding to the Examples, it is to be understood that this disclosure is not limited to particular aspects described, and as such may, of course, vary. Other systems, processes, features, and advantages of foam compositions and components thereof will be or become apparent to one with skill in the art upon examination of the following drawings and detailed description. It is intended that all such additional systems, processes, features, and advantages be included within this description, be within the scope of the present disclosure, and be protected by the accompanying claims. It is also to be understood that the terminology used herein is for the purpose of describing particular aspects only, and is not intended to be limiting. The skilled artisan will recognize many variants and adaptations of the aspects described herein. These variants and adaptations are intended to be included in the teachings of this disclosure and to be encompassed by the claims herein.

C. EXAMPLES

The following examples are put forth so as to provide those of ordinary skill in the art with a complete disclosure and description of how the compounds, compositions, articles, devices and/or processes claimed herein are made and evaluated, and are intended to be purely exemplary of the disclosure and are not intended to limit the scope of what the inventors regard as their disclosure. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric.

Example 1. Carbon Foam Produced at Atmospheric Pressure Using Lignite Coal

Described herein is a process of producing carbon foam at atmospheric pressure starting with lignite coal crushed and ground to about 60 mesh particle size. The process was used to produce three different samples from different particle size ranges with all other variables remaining constant. The process was observed to further provide graphene oxide film that was deposited on the underside of the lid covering the sample. Without wishing to be bound by a particular theory, it is believed that the deposition of the graphene film is associated with the escaping volatiles produced during the heating steps. Further experiments have shown that the available surface area, as well as the shape or geometry of the surface, in contact with the escaping volatiles can alter the quantity and consistency of the graphene oxide film deposited. In a further aspect, trace amounts of fine graphene oxide flakes were observed in the bottom of the crucible after the foam had been removed.

Images detailing various aspects of Example 1 are shown in FIGS. 1-4, which are further described in "Brief Description of the Figures" above.

Coal Conversion Process—Pitch Production:

The process described herein begins with lignite coal ground and passed through a 60-mesh sieve. This is the standard particle size range used for the testing system, and the particle size can be varied without departing from the disclosed process. In particular, the particle size may be further optimized during scaling for commercial operations. Following grinding and sieving, a slurry was prepared by dispersing 15 pounds of the ground coal in 42 pounds of conditioned solvent recycled through the disclosed process. The solvent consists of condensed and recycled volatiles from previous experiments employing the carbon conversion process. Three pounds of hydrogenated vegetable oil was also added to the slurry. Without wishing to be bound by a particular theory, it is believed that the vegetable oil can act as a hydrogen donor during the disclosed conversion reaction.

The slurry was mixed via agitation, and then transferred into a stirred 10-gallon reactor vessel for the coal digestion reaction. The mixture homogeneity was maintained in the reactor vessel. Inside the reactor vessel, the slurry was heated to about 120° C. and held at this temperature to allow vaporization of any water and low boiling point volatiles present in the coal and/or recycled solvent. The vapors, comprising water and low boiling point volatiles, produced in this heating step were vented to a moisture collection vessel and removed from the reaction mixture. The contents of the moisture collection vessel were collected, weighed, and sampled.

The reactor was then isolated and the temperature increased to about 550° C. and held there for about one hour. The pressure inside the reactor was maintained between about 500-600 psig, with venting used to remove excess volatiles from the reactor into an expansion tank. The vapors produced at about 550° C. were passed through a water cooled heat exchanger enroute to the expansion tank, providing condensation of the vapors to a volatile liquid mixture. The liquid volatiles recovered from the coal digestion reaction were weighed, sampled, and added to the recycle solvent mixture for use in future experiments. The non-condensable gases produced by the reaction were further vented from the expansion tank to a scrubber. The non-condensable, vented gases comprise hydrogen sulfide. Without wishing to be bound by a particular theory, it is believed that the hydrogen sulfide is produced by the removal of sulfur from the coal during the conversion reaction process.

Once the reaction phase was complete, the remaining pressure in the reactor was vented to the expansion tank. The remaining liquid contents of the reactor, which are a low softening pitch mixture, were transferred into a larger volume holding tank called a flash vessel to cool. The low softening point pitch mixture, which comprises a mixture of reacted coal and mineral matter, remained in the flash vessel until the temperature was reduced to 150° C. When the low softening point pitch mixture had reached the proper temperature, the low softening point pitch mixture was transferred into a centrifuge processing tank comprising a centrifuge is fixed atop a processing tank. The centrifuge system was also equipped with a gear pump to recycle the extract through the flow driven centrifuge where the ash is concentrated and collected within the rotating spindle. When the ash removal process was complete, the centrifuge spindle was removed and weighed for mass balance data. The enriched ash centrifuge tails were removed from the spindle and maintained for analysis. The spindle was cleaned and prepared for the next experiment.

The centrifuge was a "spinner-type centrifuge" most often used to separate particulate matter from industrial motor oil. This particular centrifuge was selected for the disclosed coal conversion process because the concentrated ash removed from the extract is collected and maintained in the rotating spindle. The centrifuge tails were collected as a cake-like residue of mineral matter and volatiles along the inside surface of the centrifuge spindle. The collected residue can be rich in mineral matter and is unaltered by the relatively mild conditions of this process. Depending upon the specific characteristics of the coal used in the process, the collected mineral matter can contain appreciable levels of rare earth elements (REE), and accordingly, can be considered an enriched rare earth elemental feedstock for further refining.

The efficiency of the centrifugation step can be limited by the mechanics of the pump and the viscosity of the extract. It is to be understood that without departing from the disclosed process, the disclosed procedure can be scaled to use a centrifuge comprising a motor driven scroll-type centrifuge for improved efficiencies.

The de-ashed pitch was then pumped into a vacuum distillation apparatus, and the distillation carried out by increasing the temperature to about 280° C. while maintaining a vacuum of about 50 torr. The vacuum distillation column was equipped with a low flow rate nitrogen sparge to help facilitate the flow of volatiles from the pitch. Moreover, without wishing to be bound by a particular theory, the nitrogen sparge is believed to facilitate orientation the various moieties in the carbon pitch as it forms. The overall distillation system was also equipped with a set of distillate collection vessels and condensers in parallel to collect different "cuts" of the potentially valuable distillation volatiles. The volatiles were collected for analysis and weighed for mass balance data. The pitch was then drained from the distillation column as a liquid at elevated temperature. The pitch was allowed to cool to room temperature where it solidified. Additional aspects of pitch production methods that can be used with the presently disclosed methods, including processing equipment, are described in U.S. Pat. No. 8,226,816 and U.S. patent application Ser. Nos. 13/166,229 and 14/513,745, each of which is incorporated by reference in their entirety.

Foaming Pitch Preparation:

The system to prepare the foaming pitch is the similar to systems used to prepare the green coke as described in U.S. Pat. No. 8,226,816 and U.S. patent application Ser. Nos. 13/166,229 and 14/513,745, each of which is incorporated by reference in their entirety. The major differences are that the pitch was heated to temperatures lower than the point of producing green coke. At these temperatures the pitch partially devolatilizes while retaining several characteristics of pitch. That is, the foaming pitch possesses a high enough volatile content where the material is fluid enough at elevated temperatures to fuse the carbon particles into carbon foam.

A second major difference in the foaming pitch preparation compared to similar, convention procedures is that the system is operated at a slight vacuum (about 700 torr±10 torr; although the procedure can be carried out up to ambient pressure). It should be noted that the slight vacuum can decrease (i.e., pressure increased up to ambient pressure of about 740 torr) during green coking temperature ranges as volatiles escape the pitch in greater quantities. The slight vacuum increased the efficiency of removal of volatiles at the lower temperatures used. Moreover, the slight vacuum also provided for capture of the volatiles escaping from the pitch to a vapor collection system. Therefore, the volatiles did not condense and reflux when contacting the unheated surface of the coking vessel lid.

After the pitch was produced, it was placed into a storage container, then it was placed at about −5° C. for about 12 hours. At this lower temperature, the pitch is brittle and can easily be removed from the storage container. The pitch was removed from the storage container (e.g., in the studies described herein, it was removed using a hammer and paint scraper). The pitch was then weighed for assessment of mass balance, and then transferred into a customized coking vessel by pouring it into the top open flange. The lid gasket of the coking vessel was inspected and replaced if needed. The lid for the coking vessel was then bolted into place and the vessel properly insulated using high temperature insulation. The coking vessel, held in the portable stand, was then moved into place and connected to the volatile recovery section of the system. It was also connected to the nitrogen feed and the power source.

Once the coking vessel was in place and connected to the nitrogen feed and the power source, the nitrogen purge was turned on at a flow 20 psi. Without wishing to be bound by a particular theory, it is believe that the nitrogen flow serves two purposes. First, the nitrogen flow enables creating an inert environment within the coking vessel. Second, the nitrogen flow facilitates escape of the volatiles to the condensation and recovery portion of the coking system. The temperature of the vessel was heated from room temperature to 500° C. as rapidly as possible. In the studies described herein, it took about 3 hours heating time in order to reach 500° C. from room temperature. The temperature was then maintained for an additional six hours as the pitch continued to devolatilize. The coker and contents were then allowed to cool for 12 hours.

Once cooled, the coking vessel was disconnected from the power supply, nitrogen source, and volatile recovery portion of the system. The vessel was then moved from processing areas to remove the foaming pitch. The insulation from the coking vessel was removed from the top and bottom flanges. The top and bottom flanges were then unbolted and removed. A chrome plated steel plunger slightly less in the inside diameter the coking vessel was then used to push the foaming pitch out of the vessel and into the collection container below. The foaming pitch was then weighed, inspected, and a sample taken for analysis.

After inspection, the foaming pitch was further devolatilized by loading it back into the coking vessel for a second heat treatment and heating to 525° C. where it was held for eight hours at temperature. This procedure follows the exact same procedure described above in the section.

Grinding and Sizing the Foaming Pitch:

Average particle size and particle size range are importants variable in producing foams of different quality and consistency. The particle size was also related to the level of volatile material in the foaming pitch, which can be controlled by the partial coking process described in the previous section. These are the two main operating conditions and variables that govern the quality and consistency of the carbon foam produced. The final factor was the quality of the pitch produced by the carbon conversion process.

After removing the foaming pitch from the coking vessel, the pieces ranged in size from roughly 0.5 cm to 8 cm. The larger pieces were crushed with a hand-operated rock crusher comprising a 3-inch diameter steel tube with a baseplate and open at the top. The weighted piston was lowered into the tube to crush the material within. The smaller pieces were then placed in a mortar and pedestal and ground to the desired particle size for the experiment.

The particle size distribution for this example was determined to be 20 to 50 mesh, 50 to 100 mesh, and less than 100 mesh. A series of sieve trays was assembled to separate the particles into the desired ranges. The collection pan was on the bottom followed by the 100-mesh sieve on top of that. Then the 50-mesh sieve was placed on top followed by the 20-mesh sieve. 200 g of the foaming pitch was weighed. The pitch included an even distribution of smaller pieces (about 1 cm), medium sized pieces (about 1.2 cm to about 2 cm), and larger pieces (about 2.5 cm to about 8 cm). The smaller pieces were poured on top of the 20-mesh sieve tray on the previously assembled stack of trays. The large and medium pieces were placed in the rock crusher and reduced in particle size. After the pitch was crushed, it became compacted in the bottom of the rock crusher. The pitch was loosened using a quarter inch stainless steel rod and the contents also poured on to the 20-mesh sieve tray.

The lid was placed on top of the sieve tray and it was shaken by hand to separate the material into the desired particle size ranges. This action included shaking the assembled sieve tray back and forth and side the side. The assembled tray stack would then be tapped on the bench top to assist the particles through the trays. The lid of the sieve trays was then removed. The larger remaining particles were once again transferred to the rock crusher. While the smaller remaining particles on the 20-mesh sieve tray were transferred to the mortar and pedestal. The pitch was once again crushed in the rock crusher and loosened with a stainless steel rod. The contents of the rock crusher were poured on top of the 20-mesh sieve tray. The smaller particles transferred to the mortar and pedestal were ground for several minutes and the contents also dumped on top of the 20-mesh sieve tray. The smaller compacted particles on the inside of the mortar were scraped off using a stainless steel scapula.

The lid was placed on top of the assembled sieve trays which were once again shaken by hand for several minutes to separate the particles. The particles remaining on top of the 20-mesh sieve tray was once again transferred to the mortar and pedestal to grind to a finer particle size. These actions were repeated several times until the majority of the 200 g sample had passed through the 20-mesh sieve tray. As the particles became finer, it was necessary to periodically disassemble the sieve tray and tap the mesh screens as well as wiped with a rubber spatula to eliminate the blinding defect. After the majority of the foaming pitch passed through the 20-mesh sieve, there was an appreciable amount of material in each desired particle size for the required experiments.

Loading the Crucibles:

The foaming pitch which had been crushed, ground, and separated into desired particle size ranges as described above, was then loaded into crucibles for the first heat treatment and foaming step of the disclosed process. The crucible had a flat disc shape, e.g., see FIGS. 1-3, with dimensions of about 45 mm diameter and a height of about 8 mm. In this example, about 18.0 grams of foaming pitch were loaded into the crucible. From previous experiments, it was noted that packing the particle sizes tightly into the crucible resulted in fewer void spaces on the bottom surface and within the foam. It also produced an overall more consistent foam.

Crucible Preparation:

To ensure the crucibles used to prepare the carbon foam experiments were free of contaminants, they were thoroughly cleaned prior to loading the foaming the pitch. Three identical crucibles were selected which had previously been numbered for identification. Additionally, three lids which were also previously numbered and completely covered the crucibles were selected as well. The crucibles and lids were wiped out with moist paper towels and then rinsed with water and soap solution to remove the majority of any contaminants. The crucibles and lids were then placed inside of a furnace and heated to 600° C. and held for four hours under an oxidizing environment to combust any remaining contaminants on the crucibles and lids. After the crucibles and lids were left to cool, they were weighed and recorded prior to being loaded with the ground and sized foaming pitch.

Foaming Preparation:

The lid and 20 mesh sieve from the assembled sieve trays was removed and the 20-50 mesh particle size foaming pitch was loaded into the first crucible in roughly 2 to 3 g increments with a scoopula. Each time an increment the foaming pitch was added to the crucible, it was packed into the corners and pressed down to tightly packed the particles and create a more consistent carbon foam. The crucibles were filled completely to the top to ensure a consistent size and the ability to properly pack the particles into the crucible and remove any void spaces. Once the crucibles were filled, an additional amount of foaming pitch was placed on top and pressed using the flat stainless steel scoopula. The packing of the crucible occurs straight across the surface. The crucible was then rotated 90° and packed again using the flat surface. Several additional increments of foaming pitch were placed on top and packed again. Any loose foaming pitch was scraped off across the top of the crucible using the edge of the scoopula in order to ensure a consistent size for each of the three samples in assessed this example. This action was repeated several times until the foaming pitch was properly packed into the crucible. The packed 20-50 mesh crucible was then weighed and recorded to determine the total weight of foaming pitch for the sample.

The 50-mesh sieve tray was then removed from the assembly and any remaining foaming pitch is collected, weighed, labeled, and stored for future experiments. The second crucible is then loaded with foaming pitch from the particle size range of 50-100 mesh. It is loaded and pressed into the crucible in the exact same manner as the first sample to maintain consistency. The packed 50-100 mesh crucible was then weighed and recorded to determine the total weight of foaming pitch for the sample.

The 100-mesh sieve tray was then removed from the assembly and any remaining foaming pitch is collected, weighed, labeled, and stored for future experiments. The third crucible is then loaded with foaming pitch from the particle size range of 100 mesh. It was loaded and pressed into the crucible in the exact same manner as the first two crucibles described above in order to maintain consistency. The packed 100 mesh crucible was then weighed and recorded to determine the total weight of foaming pitch for the sample.

Creating a Non-Oxidizing Environment:

In order to heat the foaming pitch to higher temperatures, a non-oxidizing environment or environment void of oxygen is required. At the temperatures utilized, in the absence of a non-oxidizing environment, the foaming pitch would combust and turn to ash rather than form a carbon foam. In order to maintain consistent heating rates for this example, flowing an inert gas such as nitrogen or argon was avoided. It was also not an option to fill the furnace with an inert gas and isolate due to volatiles and other gases escaping from the foaming pitch as it is heated. Therefore, the crucibles were isolated from the oxidizing environment by preventing oxygen from reaching the crucibles and foaming pitch inside.

The three packed and weighed crucibles were fitted with a properly sized lid which had also been numbered in weighed. The crucibles were placed inside of a ceramic bowl with a flat bottom and vertical sides roughly 8 inches in diameter by 4 inches high. Graphite chips with the consistency of sand were then poured over the crucibles into the ceramic bowl to a height of roughly 2½ inches that completely covered the crucibles fitted with lids. The graphite chips being primarily composed of carbon would oxidize to carbon dioxide prior to the oxygen reaching the crucibles with the foaming pitch. The graphite chips would also allow any volatiles or other gases escaping from the samples to exit the ceramic bowl and ultimately the furnace.

On top of the graphite chips were placed three layers of steel wool. The first two layers of steel wool were ultrafine while the top layer was course. For the first layer, two ultrafine steel wool pads were unrolled into flat rectangular sheets. One of the long sides of both sheet was stretched by hand to better fit into the curved inside surface of the ceramic bowl. The stretched sheets were then placed on the surface of the graphite chips inside the ceramic bowl. They were pressed down by hand and fitted to create a consistent layer of the steel wool covering the entire cross-sectional area of the ceramic bowl.

The graphite chips used herein had an average size of about 1 mm to about 2 mm, with a geometry of roughly spherical to roughly curbical. Graphite chips were obtained from GrafTech (Parma, Ohio, USA). The amount of graphite chips used relative to the mass of the foamed sample was about 10:1. In various aspects, the amount of graphite chips relative to the mass of the foamed sample can be from about 1:1 to about 100:1, or any ratio encompassed within the foregoing ranges, or any sub-range thereof.

The ceramic bowl was then rotated 90° and the second layer of ultrafine steel wool was inserted in the same manner as the first. This is to cover any gaps in the center of the steel wool and create a more consistent layer at the edge of the ceramic bowl. The ceramic bowl was once again rotated 90° and the third layer of course still wool was inserted in the same manner. With the ceramic bowl now completely filled, the steel wool was once again stretched and fitted into the proper shape. The steel wool extending above the rim of the ceramic bowl was then pressed down along the vertical sides of the bowl. This provided an additional depth of steel wool at the edge of the container which is the most likely place for oxygen to enter.

A nine inch square ceramic tile was then placed on top of the ceramic bowl. This configuration prevented oxygen from reaching the foaming pitch samples and also allowed the volatiles and other gases produced in the experiment to escape. Furthermore, consistent heating rates can be applied to the samples by avoiding flowing inert gas to the furnace.

The First Heat Treatment and Foaming:

The disclosed process relies, in part, upon a carefully controlled heat rate at different temperature points. A controlled heating rate facilitates creating a fairly consistent heating gradient throughout the volume of the foaming pitch as volatiles are escaping the samples. The ceramic bowl containing the three samples was placed into a furnace capable of reaching temperatures of 1100° C.

The furnace was programmed with the following heating rates: (a) from room temperature, the temperature of the furnace was increased at a rate of 300° C. per hour to 450° C.; (b) once the furnace reaches 450° C., the heating rate was decreased to 100° C. per hour until reached 500° C.; (c) at that point, the heating rate was decreased once again to 25° C. per hour until it reached 600° C.; (d) the heating grate was decreased to 20° C. per hour until the furnace temperature reached 700° C.; and (e) the furnace was then held at 700° C. for one hour. After the foregoing heating program, the furnace was set to shut off and cool slowly over ten hours. Once the contents of the furnace of cooled, the furnace was opened and the ceramic bowl removed.

The ceramic tile was removed from the ceramic bowl. The steel wool, which had significant oxidation and fused together to one mass, was removed in one piece using the flat edge of the scapula and discarded. Using various sized scoopulas, the graphite chips were carefully removed and returned to the storage container for use in future experiments. Once the graphite chips are essentially removed, the scoopula was slid underneath one of the crucible while holding the lid tight and lifted out. The remaining graphite chips were dusted off to avoid contamination of the carbon foam sample with the graphite chips.

The foregoing was repeated for the second and third samples to separate them from the graphite chips. The remaining graphite chips in the ceramic bowl were returned to storage container for use in future experiments. The carbon foam samples were removed from the crucible, inspected, and weighed. The foam samples were also tested for electrical conductivity, and it was determined that each of the three samples was electrically conductive.

Calcining the Carbon Foam:

After the carbon foam was formed during the first heat treatment to 700° C., as described above, a second the treatment was performed to drive off additional volatiles, increase the carbon percent of the foam, and increase the strength and crush resistance of the foam. It should be noted that the foaming and calcination sections can be performed in one step, and not as two separate heat treatments as described herein. However, this process using two heat treatments was employed so that the foams could be tested discretely after foaming and calcination for electrical conductivity, volatile percent decrease, and other properties.

After the first heat treatment and basic analysis of the samples described in the previous section, the carbon foam was placed back in the original crucible and covered with the original lid. The crucibles were then placed back into the ceramic bowl and covered with graphite chips and three layers of steel wool as described in the nonoxidizing environment section. The ceramic tile was placed back on top of the ceramic bowl and the whole assembly was placed back inside the high temperature furnace.

The furnace was then programmed to calcine the carbon foam samples to 900° C. following the heating rates: (a) the furnace was heated at a rate of 500° C. per hour up to 400° C.; (b) the heating rate was reduced to 100° C. per hour up to the temperature of 550° C.; (c) the heating rate was reduced to 50° C. per hour to a temperature of 700° C.; (d) the heating rate was further decreased to 25° per hour up to 900° C.; and (e) the temperature was held at 900° C. for one hour before the heating was terminated, and the contents of the furnace were allowed to slowly cool over 12 hours.

After the contents of the furnace were cooled, the ceramic bowl containing the samples was removed from the furnace and emptied in the same manner as the first heat treatment. The calcined carbon foam samples removed from the crucibles and weighed, inspected, and labeled. In this example, the initial weight of the foaming pitch loaded into the crucible was 18.0 grams, and the final weight of the calcined carbon foam was 13.2 grams.

Example 2. Carbon Foam Produced at Atmospheric Pressure Using Lignite Coal

Example 2 describes a disclosed process of producing carbon foam at atmospheric pressure starting with lignite coal crushed and ground to 60 mesh particle size. The process shares many aspects with the process described above for Example 1. The foaming pitch used in this example was produced in the same batch as the foaming pitch described above for Example 1. A distinction regarding the process used herein for Example 2 was that only a single larger sample was produced with the particle size range between 30-50 mesh and was produced in a crucible or mold of a different shape. Example 2 shows that consistent foams can be produced at a larger scale without affecting the quality of the foam. Furthermore, Example 2 shows that the carbon foam can be produced in molds of various sizes and shapes without the need for costly post foaming processing.

Figure 5:
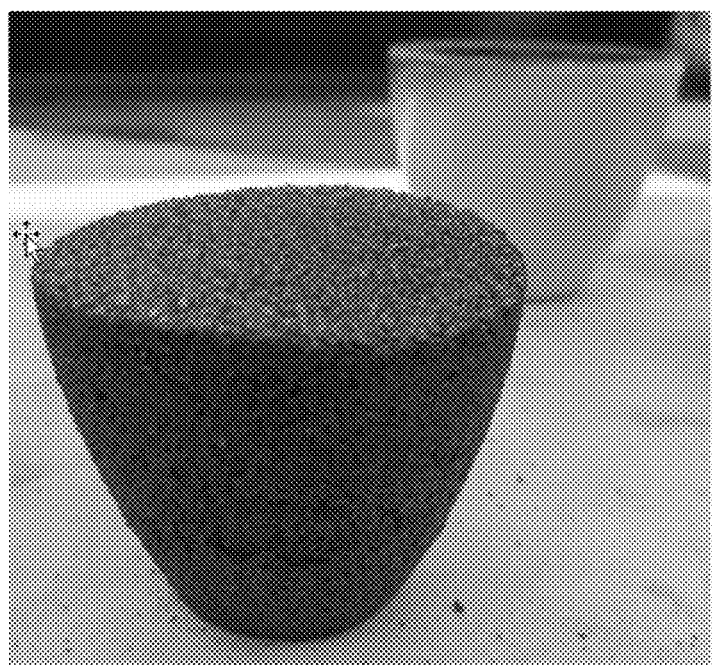
FIG. 5 shows a representative image of a larger sample of a disclosed carbon foam prepared from lignite coal feedstock using a disclosed process described in Example 2.
Figure 6:
FIG. 6 shows a representative image of a disclosed graphene oxide which formed on the lid covering the carbon foam shown in FIG. 5 that was prepared from lignite coal feedstock using a disclosed process. The image shows a greater deposition of the graphene oxide than that in the sample shown in FIG. 4.

Images detailing various aspects of Example 2 are shown in FIGS. 5-6, which are further described in "Brief Description of the Figures" above.

Figure 19:
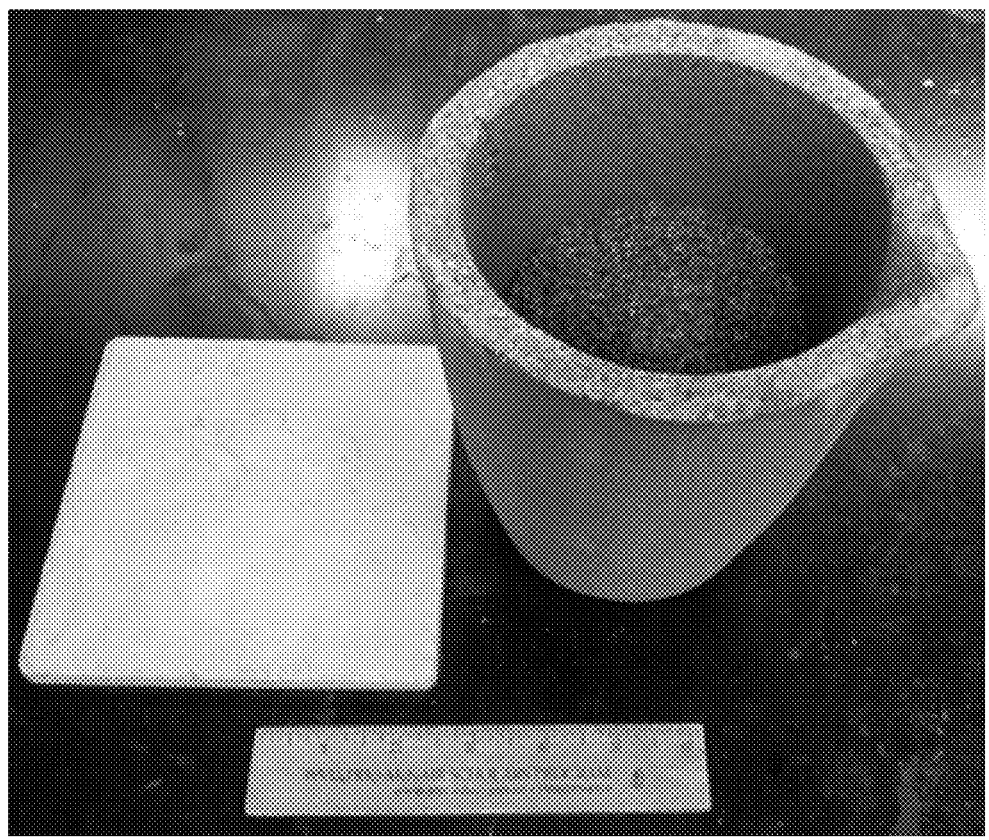
FIG. 19 shows a representative image of a graphite crucible comprising carbon chips which are utilized to provide a non-oxidizing environment used in the disclosed processes.

Further, Example 2 differs from Example 1 in the container used to create the nonoxidizing environment for the first heat treatment for initial foaming as well as the calcination steps of the procedure. Due to the height of the crucible use for this example, a ceramic bowl was unable to be used. Instead, a large graphite crucible roughly 1 quart in volume was used. The graphite crucible can be seen in FIG. 19. As with the ceramic bowl from the first example, the foaming pitch was loaded into the crucible which was then covered with a ceramic lid. The ceramic lid was the same size as the lid used in Example 1 in order to observe any differences in the graphene oxide film deposited on the underside. The ceramic crucible containing the foaming pitch was then placed inside a graphite crucible and buried in graphite chips. Three layers of steel wool were laid on top of the graphite chips with the bottom layer comprising ultrafine steel wool and the top layer comprising course steel wool. The graphite crucible was covered with a six-inch ceramic tile and placed in the furnace for the foaming step.

As observed in the studies described for Example 1, it was observed in the Example 2 studies that a graphene oxide film was deposited on the underside of the lid covering the sample due to the escaping volatiles. In addition, it can be seen when comparing FIG. 4 from Example 1 and FIG. 6 from Example 2 that the increased mass of foaming pitch, and therefore increased mass of volatiles escaping, produced a slightly darker and thicker graphene oxide film on the underside of the lid.

Graphene oxide flakes were also observed in the bottom of the crucible after the foam had been removed. The amount of increase for the graphene oxide flakes between Examples 1 and 2 was more pronounced than the increased amount of graphene deposited on the underside of the lid. Not only was there greater mass of the graphene oxide flakes, but they were also larger flakes compared to the fine graphene oxide flakes observed in Example 1.

Figure 18:
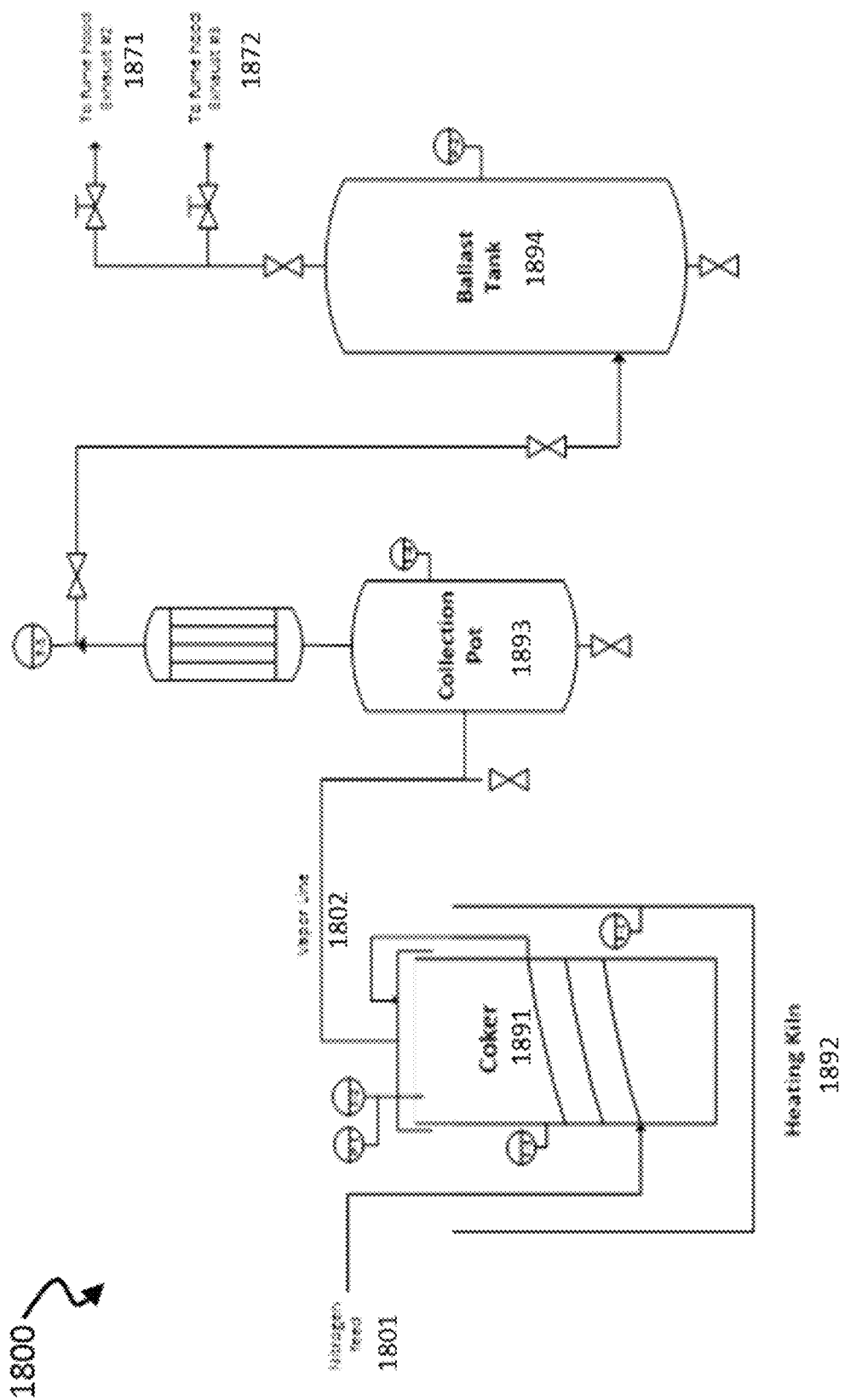
FIG. 18 shows a process flow diagram, 1800, the coking step corresponding to block, 1593, of the representative disclosed coal conversion process, 1500, shown in FIG. 15. In the process shown, during coking step, pitch is converted to foaming pitch.

Example 3. Carbon Foam Produced at Atmospheric Pressure Using Bituminous Coal As with the previous examples described herein above, Example 3 follows a procedure similar to that described above for Example 1, with one major difference in several minor differences. The major difference was that the feedstock coal used in this example was bituminous coal instead of lignite coal, which was used in Examples 1 and 2. It was processed into pitch using the essentially the same coal conversion process as described herein above, with a minor difference in the conditions used for the vacuum distillation step. Specifically, the vacuum distillation was carried out at 290° C. and 27.5 mm Hg vacuum. A further difference was with regard to foaming pitch step. Specifically, in this example, Example 3, instead of being processed twice with the first being to 500° C. and the second being to 525° C. (as described for Examples 1 and 2), it was only processed once to 525° C. and held for 10 hours in the green coking system shown in FIG. 18.

Images detailing various aspects of Example 3 are shown in FIGS. 7-11, which are further described in "Brief Description of the Figures" above.

The foaming pitch was crushed, ground and sized in the exact same manner as an Example 1. The foaming pitch derived from the bituminous coal had a slightly higher volatile content than the foaming pitch derived from lignite coal in the first two examples. The particle size range used in this example was between 50 To 100 mesh and it was loaded into an identical crucible and lid from the first example. The nonoxidizing environment was achieved using the ceramic bowl with graphite chips and layers of steel wool with the ceramic tile placed on top. The foaming step and calcination steps were also performed in the same manner as the first two examples.

Figure 7:
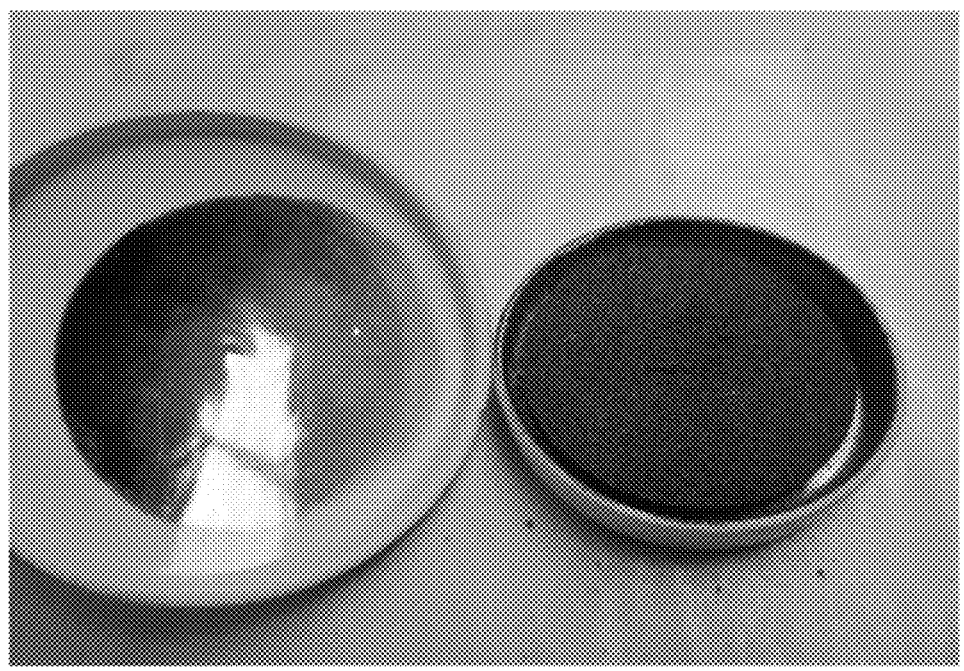
FIG. 7 shows a representative image of a larger sample of a disclosed carbon foam prepared from bituminous coal feedstock using a disclosed process described in Example 3. The foaming pitch prepared from the bituminous coal feedstock had a greater volatile percent than the foaming pitch prepared from lignite coal feedstock. The image shows that amount of disclosed graphene oxide deposited on the lid was greater than that deposited in the samples shown in FIGS. 4 and 6, which were prepared from lignite coal feedstock.
Figure 8:
FIG. 8 shows a representative image of the sample crucible shown in FIG. 7, but with the carbon foam sample removed from the crucible. As shown, there is deposition of disclosed graphene oxide on the inside surface of the crucible.
Figure 9:
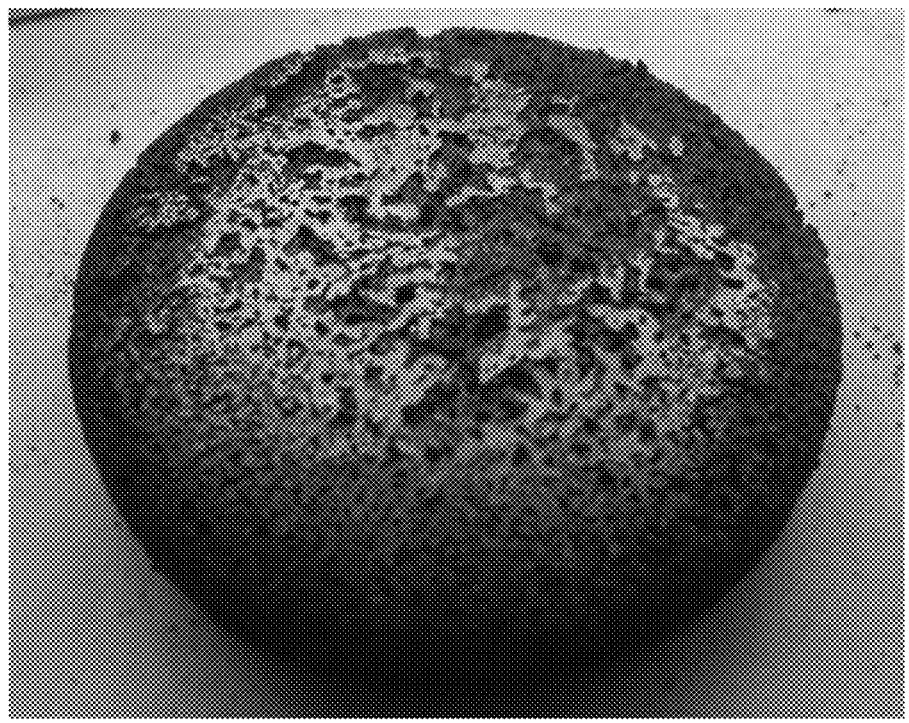
FIG. 9 shows a representative of the underside of the carbon foam shown in FIG. 7. The image shows a disclosed carbon composite that was produced during preparation of a disclosed carbon foam by the disclosed processes. The image shows that a disclosed carbon composite formed from distinct carbon materials fusing together on the bottom surface of the carbon foam that is in contact with the bottom interior surface of the crucible.
Figure 10:
FIG. 10 shows a representative image of a disclosed carbon composite material co-formed during preparation of a disclosed carbon foam as described in Example 3.
Figure 11:
FIG. 11 shows a representative image of the interior of a crucible used in a disclosed process to prepare a carbon foam as described in Example 3, after removal of the carbon foam from the crucible. The image shows representative disclosed graphite flakes and graphene oxide which are co-formed by a disclosed process as a secondary product during preparation of a carbon foam.

The foaming pitch derived from bituminous coal with a slightly higher volatile content also produced a quality carbon foam. However, as shown in FIGS. 7-9, there were several differences in the materials produced. The first observation was that a much thicker and darker graphene film was deposited on the underside of the lid due to the increased volatile content of the foaming pitch and therefore the increased mass of volatiles escaping the pitch. The second observation was that the graphene oxide film was also deposited on the inside of the crucible that contained the foaming pitch. In addition, only trace amounts of fine graphene oxide flakes remained in the crucible after the foam was removed. Finally, as can be seen in FIG. 9, two distinctly materials are observed to have fused together to form a composite carbon foam. From these observations, as well as observations from other examples described herein, the characteristics of the foam produced and the yield of the secondary products can be controlled and altered by the volatile percent of the foaming pitch. In addition the volatile percent of the foaming pitch also provides the ability to form composite carbon foam materials without layering in different foaming pitches. It is believed that the foam produced in this experiment is a composite carbon foam and graphene oxide (or possibly graphite) carbon material.

The volatile percentage of the foaming pitch can be determined prior to the 'initial heating step' of foam production. It is believed to be a function of the final soak temperature of the 'foaming pitch preparation' step (which can determine the volatile content driven from the carbon pitch) based on the properties of the specific coal derived carbon pitch feedstock. That is, in various aspects, threshold levels for volatile percent associated with secondary products vary depending on the specific properties of the feedstock pitch. Other methods to manipulate or control the volatile percent of the foaming pitch, i.e., other than the 'foaming pitch preparation' step, involve altering the characteristics of the feedstock carbon pitch such as increasing or decreasing the final temperature or level of vacuum during the vacuum distillation step or through additives or reaction conditions of the coal conversion reaction.

Figure 12:
FIG. 12 shows a representative image of disclosed graphite flakes and graphene oxide which are co-formed as a secondary product during preparation of a carbon foam using a disclosed process described in Example 4.

Example 4. Carbon Foam Produced at Atmospheric Pressure Using High Softening Point Petroleum Pitch Example 4 discloses a further disclosed process. In contrast to Examples 1-3, this example does however follow the same basic procedure for the foaming step of the first heat treatment as previously described above. Unlike the first three examples wherein coal was converted to foaming pitch and then processed into foam, this example starts with a high softening point petroleum pitch. Although, the foaming step was very similar, the results were distinct as can be seen in FIG. 12. As was discussed in above for Example 3, the volatile percent affects that the foam in the secondary products produced. The petroleum pitch had a greater volatile percent compared to volatile percent of the foaming pitches used in the first three examples. Without wishing to be bound by a particular theory, it is believed that the level of volatiles in the high softening point petroleum pitch resulted in particles not fused together to form a carbon foam, but rather formed a more of sp2 hybridized carbon material in the form of either graphene oxide, graphene, and possibly graphite. In this example, proximate analysis results are shown in Table 1 below.

TABLE 1

| Proximate Analysis Data of Pitch Sample. | |
| --- | --- |
|  | Petroleum Pitch |
| Moisture % | 0.22 |
| Volatile % | 56.35 |
| Ash % | 0.05 |
| Fixed Carbon % | 43.38 |

Figure 13:
FIG. 13 shows a representative image of disclosed graphite flakes and graphene oxide which are co-formed by a disclosed process as a secondary product during preparation of a carbon foam. The image shows finer particle size graphene oxide than those shown in FIG. 12.
Figure 14:
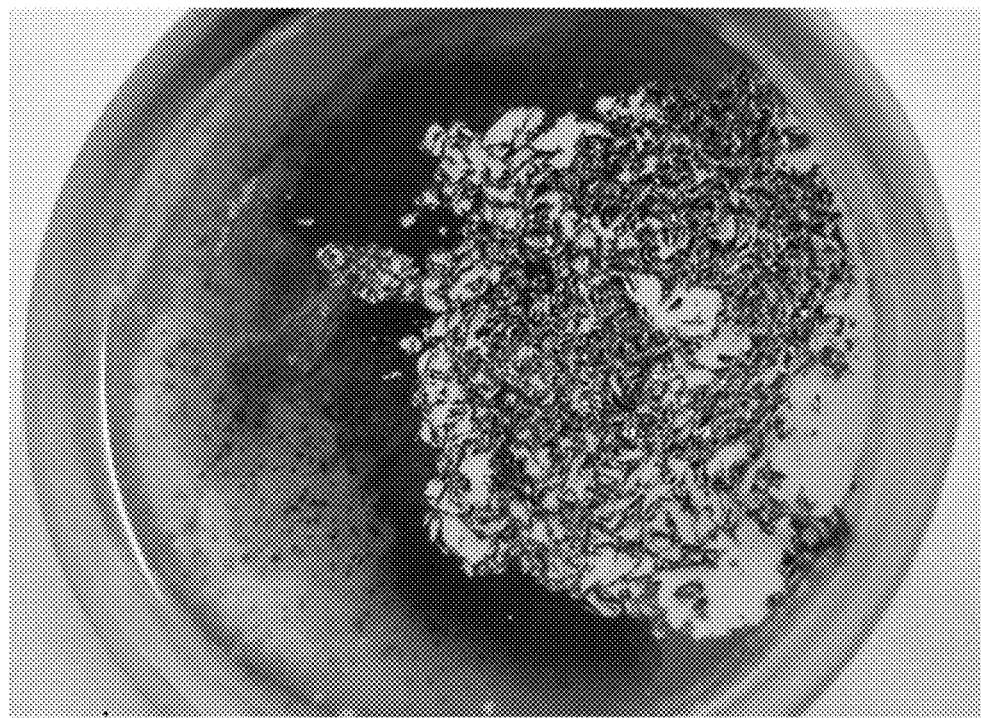
FIG. 14 shows a representative image of disclosed graphene oxide fibers prepared using a disclosed process for preparation of a carbon foam as described in Example 3. It was observed that in some instances, a heavy layer of graphene oxide is deposited on the crucible lid. Upon physically disturbing the layer of graphene, it became separated from the surface of the crucible lid, and then rolled upon itself thereby forming a narrow cylinder or fiber-like extension.
Figure 15:
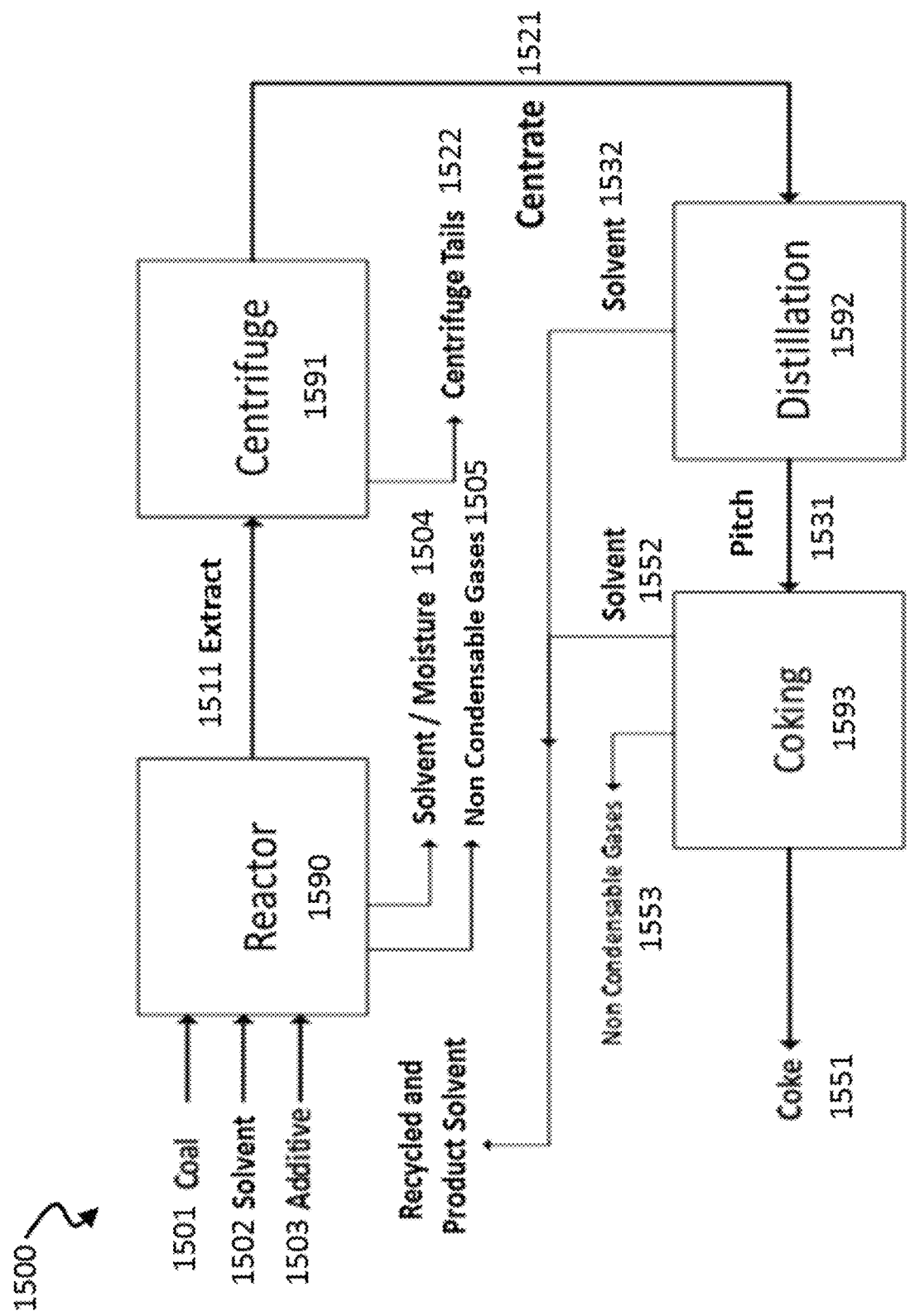
FIG. 15 shows a block flow diagram, 1500, for a representative disclosed coal conversion process.
Figure 16:
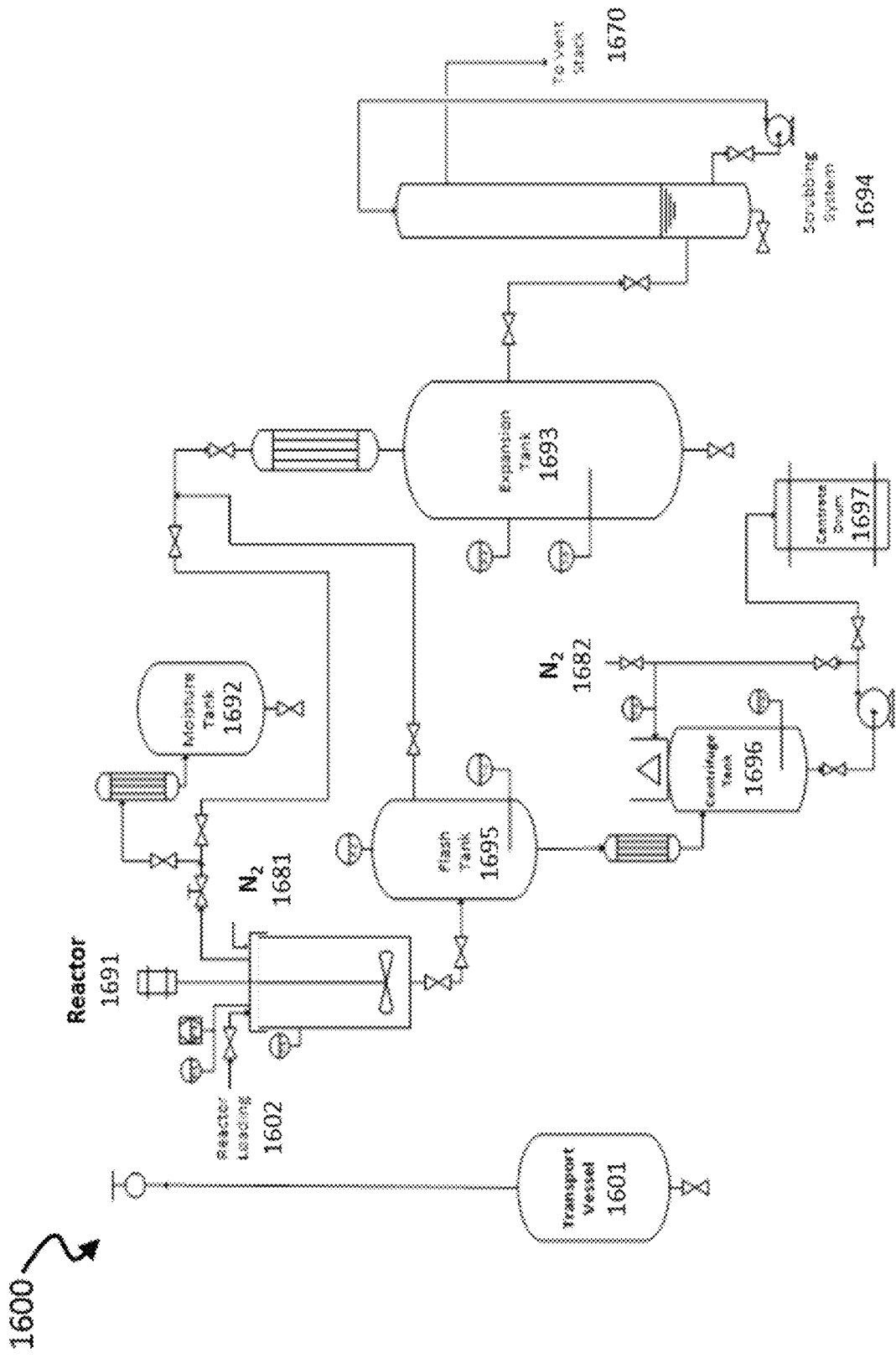
FIG. 16 shows a process flow diagram, 1600, for the reaction and ash removal steps corresponding to blocks, 1590 and 1591, of the representative disclosed coal conversion process, 1500, shown in FIG. 15.
Figure 17:
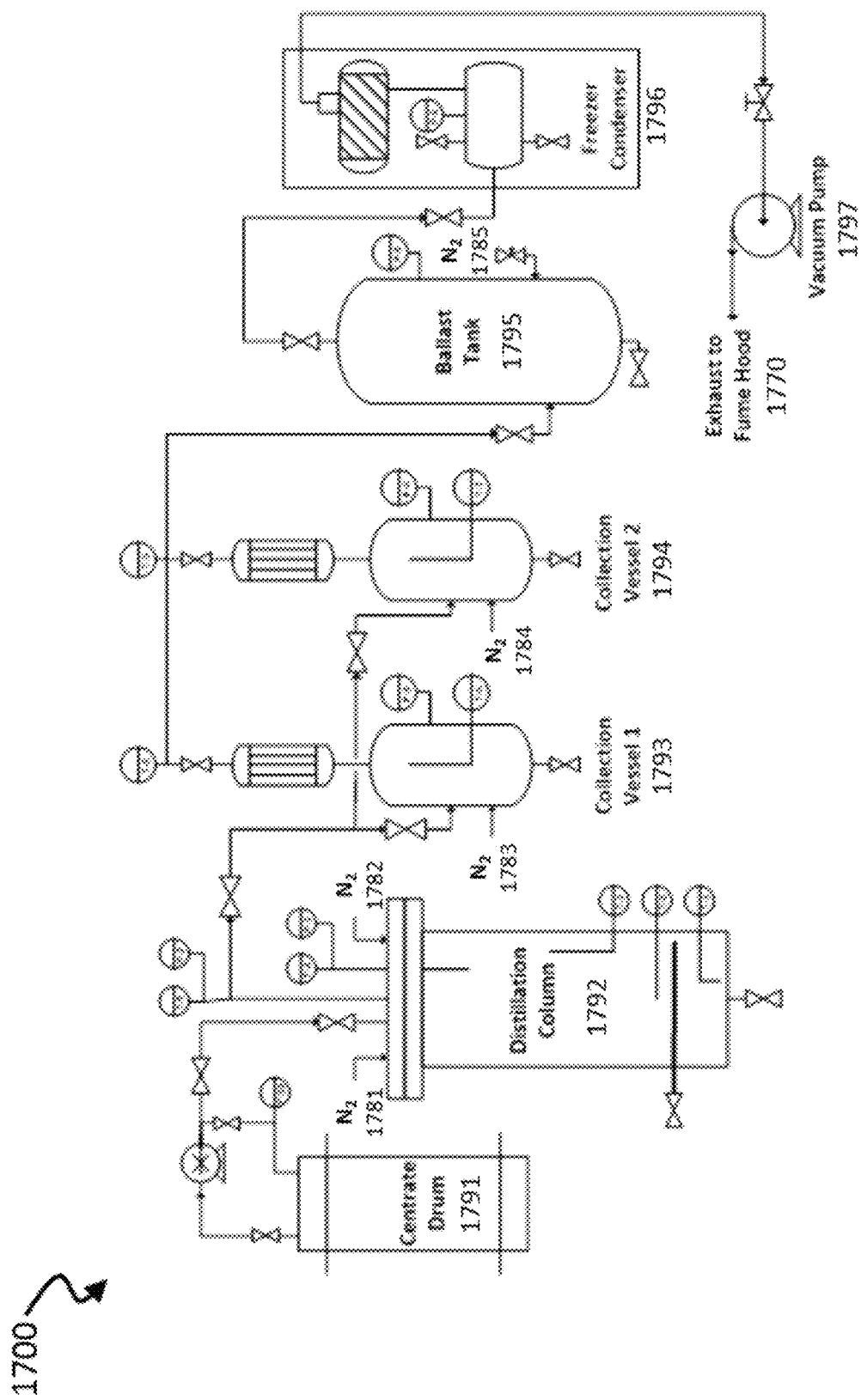
FIG. 17 shows a process flow diagram, 1700, for the distillation step corresponding to block, 1592, of the representative disclosed coal conversion process, 1500, shown in FIG. 15.

Images detailing various aspects of Example 4 are shown in FIGS. 12-14, which are further described in "Brief Description of the Figures" above.

The petroleum pitch was ground to a particle size of 60 mesh. The crucible containing the pitch was filled to roughly 25% of the volume and covered with a ceramic lid. In this example 10.2 grams of petroleum pitch were used. The crucible used in this example had a bottom diameter of 25 mm, a top diameter of 50 mm, and a height of 40 mm. The crucible containing the pitch was then placed inside of a large graphite crucible and buried in graphite chips. The three layers of steel wool were then laid down on top of the graphite chips and the crucible was covered with a six-inch ceramic tile to provide a non-oxidizing environment. The graphite crucible containing the pitch was then placed in a furnace.

The furnace temperature program was as follows: (a) initially, the temperature of the furnace was initially increased from room temperature at a rate of 100° C. per hour to 300° C.; (b) the temperature was held at 300° C. for one hour; (c) the temperature was then increased at a rate of 25° C. per hour to 720° C.; and (d) after the furnace reached 720° C., the heat was stopped without a hold time and the contents were allowed to cool slowly. Once the contents were sufficiently cool, the crucible was removed and the material inspected. The results of this example clearly showed that by altering the characteristics of the material entering the foaming step of the procedure, very different carbon materials can be produced using this process (see discussion above and FIGS. 12-14).

Example 5. Carbon Foam and Fibers Produced at Atmospheric Pressure Using Lignite Coal Example 5 describes a process of producing carbon foam which can be embedded with carbon fibers. It is believed that embedding carbon fibers can add additional strength to the carbon foam material, as well as altering properties such as electrical and thermal conductivity. The procedure used can be essentially that described above for Example 1, with the only difference being in how the crucibles were loaded in the 'Foaming Preparation' subsection described above. Specifically, as the crucible is loaded with ground and sized foaming pitch, a flat surface can be created using a flat disk of plastic cut to a diameter slightly less than the inside of the crucible. As the crucible is being packed with foaming pitch, the plastic disc can be pressed down to pack the foaming pitch into a flat surface. Carbon fibers, which are previously sized, e.g., to roughly 3 cm greater than the diameter the crucible, can be laid across the flat surface of the packed foaming pitch. Additional foaming pitch can be loaded on top of the carbon fibers and packed into the crucible until it is full and processed using the same processes as in Example 1.

Without wishing to be bound by a particular theory, it is believed that the unique disclosed methods of fusing the carbon particles together to form the carbon foam, i.e., the absence of a foaming expansion step per se, the embedded material such as carbon fibers would be able to sustain the foam formation. In addition, the absence of the expansion step would likely allow the embedded materials to be evenly distributed or concentrated based on the desired characteristics of the end product.

Example 6. Carbon Foam Produced at Atmospheric Pressure Using Lignite Coal; Carbon Foam Embedded with Diamond Powder or Particles Example 6 describes a process of producing carbon foam which can be embedded with diamond powder, e.g., with a particle size between 0.25 and 50 microns. It is believed that embedding carbon fibers can add material strength to the carbon foam material, as well as altering the thermal conductivity. The procedure used can be essentially that described above for Example 1, further comprising dispersion of the diamond powder in the ground foaming pitch prior to loading the crucible. After the foaming pitch is ground and sized, about 100 g can be weighed and separated. 1 gram of diamond powder can be added to the foaming pitch and mixed for several minutes. The foaming pitch and diamond powder can be then loaded into the crucible for the foaming step in the same manner as an Example 1.

It will be apparent to those skilled in the art that various modifications and variations can be made in the present disclosure without departing from the scope or spirit of the disclosure. Other embodiments of the disclosure will be apparent to those skilled in the art from consideration of the specification and practice of the disclosure disclosed herein. It is intended that the specification and examples be considered as exemplary only, with a true scope and spirit of the disclosure being indicated by the following claims.

What is claimed is:

1. A process for producing a carbon foam material, the process comprising:
    a first heating step comprising heating a pitch material at a temperature of about 400° C. to about 700° C. under at a pressure of 0.5 atm to about 1.2 atm for about 4 hours to about 24 hours in a non-oxidizing atmosphere, thereby forming a foaming pitch material;
    grinding the foaming pitch material to a particle size of about 10 mesh to about 400 mesh, thereby forming foaming pitch particles;
    arranging the foaming pitch particles in a mold; and
    a second heating step comprising heating the mold at a temperature of greater than about 450° C. to about 750° C. at a pressure of about 0.5 atm to about 1.5 atm for about 0.25 hours to about 12 hours in a non-oxidizing atmosphere, thereby forming a carbon foam material;
    wherein the arranging the foaming pitch particles comprises arranging foaming pitch particles having a plurality of sizes in layers; wherein a first layer comprises foaming pitch particles having a first foaming pitch particle size; wherein a second layer comprises foaming pitch particles having a second foaming pitch particle size; and wherein the first foaming pitch particle size is smaller than the second foaming pitch particle size.

2. The process of claim 1, wherein the pitch material is derived from a coal material.

3. The process of claim 2, wherein the coal material is a lignite coal material.

4. The process of claim 2, wherein the coal material is a sub-bituminous coal material.

5. The process of claim 2, wherein the coal material is a bituminous coal material.

6. The process of claim 1, wherein the pitch material is a petroleum pitch material.

7. The process of claim 1, wherein first heating step is at a temperature of about 550° C. to about 650° C.

8. The process of claim 1, wherein first heating step is carried out at a pressure of about 0.9 atm to about 1.1 atm.

9. The process of claim 1, wherein the non-oxidizing atmosphere in the first heating step is comprises less than or equal to about 5% (v/v) oxygen.

10. The process of claim 1, wherein the non-oxidizing atmosphere in the first heating step comprises an inert gas; and wherein the inert gas is argon, nitrogen, or a mixture of both.

11. The process of claim 1, wherein the arranging the foaming pitch particles in a mold comprises arranging the foaming pitch particles and an additional material.

12. The process of claim 11, wherein the additional material is a carbon fiber, a carbon nanofiber, a carbon nanotube, a carbon flake, a carbon black, an amorphous carbon, an isotropic carbon, an anisotropic carbon, a needle coke, a graphene, a graphene oxide, a diamond particle, a diamond powder, a metallic particle, a polymer-based particle, or mixtures thereof.

13. The process of claim 1, further comprising forming a secondary carbon material.

14. The process of claim 13, wherein the secondary carbon material is a graphene, a graphite, or mixtures thereof.

15. The process of claim 14, wherein the graphene is a graphene, a graphene oxide, or mixtures thereof.

16. The process of claim 14, wherein the graphite is a graphite flake.

17. The process of claim 1, further comprising calcining the carbon foam material at a temperature of about 800° C. to about 1200° C. for about 0.5 hours to about 12 hours in a non-oxidizing atmosphere.

18. A carbon foam material prepared by the process of claim 1.

* * * * *